US012074385B2

(12) United States Patent
Uchimura

(10) Patent No.: US 12,074,385 B2
(45) Date of Patent: Aug. 27, 2024

(54) ANTENNA, WIRELESS COMMUNICATION MODULE, AND WIRELESS COMMUNICATION DEVICE

(71) Applicant: KYOCERA CORPORATION, Kyoto (JP)

(72) Inventor: Hiroshi Uchimura, Kagoshima (JP)

(73) Assignee: KYOCERA CORPORATION, Kyoto (JP)

( * ) Notice: Subject to any disclaimer, the term of this patent is extended or adjusted under 35 U.S.C. 154(b) by 155 days.

(21) Appl. No.: 17/776,223

(22) PCT Filed: Nov. 19, 2020

(86) PCT No.: PCT/JP2020/043288
§ 371 (c)(1),
(2) Date: May 12, 2022

(87) PCT Pub. No.: WO2021/106756
PCT Pub. Date: Jun. 3, 2021

(65) Prior Publication Data

US 2022/0384952 A1 Dec. 1, 2022

(30) Foreign Application Priority Data

Nov. 26, 2019 (JP) ................................ 2019-213353

(51) Int. Cl.
*H01Q 5/364* (2015.01)
*H01Q 5/385* (2015.01)
(Continued)

(52) U.S. Cl.
CPC ............ *H01Q 5/364* (2015.01); *H01Q 5/385* (2015.01); *H01Q 7/00* (2013.01); *H01Q 9/0485* (2013.01);
(Continued)

(58) Field of Classification Search
CPC ............................... H01Q 9/0485; H01Q 7/00
See application file for complete search history.

(56) References Cited

U.S. PATENT DOCUMENTS 7,330,161 B2 * 2/2008 Matsugatani ........ H01Q 15/008 343/753
9,088,069 B2 * 7/2015 Bungo .................. H01Q 1/243
(Continued)

FOREIGN PATENT DOCUMENTS

EP 3846289 A1 7/2021
JP 2011109414 A 6/2011

OTHER PUBLICATIONS

Murakami et al., "Low-Profile Design and Bandwidth Characteristics of Artificial Magnetic Conductor with Dielectric Substrate" IEICE Transactions on Communications (B), 2015, vol. J98-B, No. 2 pp. 172-179, Japan, 9pp.
(Continued)

*Primary Examiner* — Ab Salam Alkassim, Jr.
(74) *Attorney, Agent, or Firm* — HAUPTMAN HAM, LLP

(57) ABSTRACT

An antenna includes a first conductor group including first conductors aligned in a first direction, a second conductor group, a third conductor group, first and second conductors, and a feed line configured to be electromagnetically connected to the first conductor. The second conductor group includes second conductors aligned in the first direction. The second conductor group is aligned with the first conductor group in a second direction intersecting the first direction. The third conductor group includes third conductors aligned in the first direction. The third conductor group is aligned with the first and second conductor groups in the second direction. The first conductor capacitively connects the first conductor group and the second conductor group. The first conductor capacitively connects the second conductor group
(Continued)

and the third conductor group. The second conductor is electrically connected to the first conductor group, the second conductor group, and the third conductor group.

12 Claims, 39 Drawing Sheets

(51) Int. Cl.
*H01Q 7/00* (2006.01)
*H01Q 9/04* (2006.01)
*H01Q 15/00* (2006.01)

(52) U.S. Cl.
CPC ....... *H01Q 15/0013* (2013.01); *H01Q 9/0421* (2013.01)

(56) References Cited

U.S. PATENT DOCUMENTS 10,476,172 B2* 11/2019 Kosaka .............. H01Q 21/0006
11,923,608 B2* 3/2024 Greenidge ............. H01Q 21/26
2003/0011522 A1* 1/2003 McKinzie, III ...... H01Q 15/008 343/700 MS
2003/0052757 A1* 3/2003 McKinzie, III ...... H01Q 15/008 335/6
2003/0197658 A1* 10/2003 Lilly .................... H01Q 15/008 343/909
2003/0231142 A1* 12/2003 McKinzie, III ...... H01Q 15/008 343/909
2004/0075617 A1* 4/2004 Lynch ...................... H01Q 1/32 343/909
2007/0075903 A1* 4/2007 Matsugatani ........ H01Q 15/008 343/909
2009/0025973 A1* 1/2009 Kazantsev ............. H01Q 1/245 174/350
2009/0140929 A1* 6/2009 Inoue ..................... H01Q 1/243 343/700 MS
2009/0295665 A1* 12/2009 Orton ................... H01Q 15/006 343/700 R
2010/0007569 A1* 1/2010 Sim ...................... H01Q 15/008 235/492
2010/0265159 A1* 10/2010 Ando ................... H05K 1/0236 343/913
2011/0115584 A1 5/2011 Kiji
2011/0248891 A1* 10/2011 Han ......................... H01Q 1/40 343/700 MS
2012/0007786 A1* 1/2012 Ando ................... H01Q 9/0457 343/905
2012/0105305 A1* 5/2012 Maruyama ......... H01Q 21/0018 343/912
2013/0002377 A1* 1/2013 Toyao ................ H01Q 15/0086 333/246
2013/0241778 A1* 9/2013 Orime ................ H01Q 15/0006 343/700 MS
2013/0278481 A1* 10/2013 Voltmer ............... H01Q 15/006 343/904
2013/0307642 A1* 11/2013 Saito ......................... H01P 1/00 333/176
2014/0097995 A1* 4/2014 McKinzie, III ........ H01Q 21/26 29/601
2016/0020648 A1* 1/2016 Contopanagos ...... H02J 50/005 307/104
2016/0276733 A1* 9/2016 Kasahara ............. H01Q 1/2216
2016/0344093 A1* 11/2016 Tagi ....................... H01Q 1/525
2017/0033468 A1* 2/2017 Wong ................. H01Q 15/0086
2019/0020100 A1* 1/2019 Jong ........................ H01Q 1/48
2019/0074133 A1* 3/2019 Contopanagos .... H01F 27/2804
2019/0098750 A1* 3/2019 Woo ........................ H01Q 9/045
2020/0076072 A1* 3/2020 Keyrouz ............... H01P 1/2005
2020/0185802 A1* 6/2020 Vilenskiy .................. H01P 1/20
2020/0235470 A1* 7/2020 Uchimura ............ H01Q 15/008
2020/0350687 A1* 11/2020 Fujishiro ................. E05F 15/75
2020/0358173 A1* 11/2020 Jong .................... H01Q 3/2617
2021/0376489 A1* 12/2021 Hiramatsu ........... H01Q 9/0421
2021/0399435 A1* 12/2021 Yoshikawa .............. H01Q 1/38
2022/0013915 A1* 1/2022 Han ..................... H01Q 9/0485
2022/0336957 A1* 10/2022 Lee ........................ H01Q 21/08
2023/0034816 A1* 2/2023 Uchimura .............. H01Q 7/005
2023/0104169 A1* 4/2023 Isoyama .............. H01Q 21/062 343/702
2023/0110878 A1* 4/2023 Hiramatsu ............... H01Q 5/40 343/702
2023/0128565 A1* 4/2023 Yoshikawa ............ H01Q 9/045 343/872

OTHER PUBLICATIONS

Murakami et al., "Optimum Configuration of Reflector for Dipole Antenna with AMC Reflector", IEICE Transactions on Communications (B), 2015, vol. J98-B No. 11, pp. 1212-1220, Japan, 10pp.

* cited by examiner

ANTENNA, WIRELESS COMMUNICATION MODULE, AND WIRELESS COMMUNICATION DEVICE

RELATED APPLICATIONS

The present application is a National Phase of International Application Number PCT/JP2020/043288 filed Nov. 19, 2020, and claims priority based on Japanese Patent Application No. 2019-213353, filed Nov. 26, 2019.

TECHNICAL FIELD

The present disclosure relates to an antenna, a wireless communication module, and a wireless communication device.

BACKGROUND ART

Electromagnetic waves emitted from an antenna are reflected by a metal conductor. A 180-degree phase shift occurs in the electromagnetic waves reflected by the metal conductor. The reflected electromagnetic waves combine with the electromagnetic waves emitted from the antenna. The amplitude may decrease as a result of the electromagnetic waves emitted from the antenna combining with the phase-shifted electromagnetic waves. As a result, the amplitude of the electromagnetic waves emitted from the antenna reduces. The effect of the reflected waves is reduced by the distance between the antenna and the metal conductor being set to ¼ of the wavelength λ of the emitted electromagnetic waves.

To address this, a technique for reducing the effect of reflected waves using an artificial magnetic wall has been proposed. This technology is described, for example, in Non-Patent Literature (NPL) 1 and 2.

CITATION LIST

Non-Patent Literature

NPL 1: Murakami et al., "Low-Profile Design and Bandwidth Characteristics of Artificial Magnetic Conductor with Dielectric Substrate", IEICE Transactions on Communications (B), Vol. J98-B No. 2, pp. 172-179

NPL 2: Murakami et al., "Optimum Configuration of Reflector for Dipole Antenna with AMC Reflector", IEICE Transactions on Communications (B), Vol. J98-B No. 11, pp. 1212-1220

SUMMARY OF INVENTION

Technical Problem

However, the techniques described in NPL 1 and 2 require a large number of resonator structures to be aligned.

The present disclosure is directed at providing a novel antenna, wireless communication module, and wireless communication device.

Solution to Problem

An antenna according to an embodiment of the present disclosure includes a first connection conductor group including a plurality of first connection conductors aligned in a first direction, a second connection conductor group, a third connection conductor group, a first conductor, a second conductor, and a feed line electrically connected to the first conductor. The second connection conductor group includes a plurality of second connection conductors aligned in the first direction. The second connection conductor group is aligned with the first connection conductor group in a second direction intersecting the first direction. The third connection conductor group includes a plurality of third connection conductors aligned in the first direction. The third connection conductor group is aligned with the first connection conductor group and the second connection conductor group in the second direction. The first conductor capacitively connects the first connection conductor group and the second connection conductor group. The first conductor capacitively connects the second connection conductor group and the third connection conductor group. The second conductor is electrically connected to the first connection conductor group, the second connection conductor group, and the third connection conductor group.

A wireless communication module according to an embodiment of the present disclosure includes the antenna described above and a radio frequency (RF) module. The RF module is electrically connected to the feed line.

A wireless communication device according to an embodiment of the present disclosure includes the wireless communication module described above and a battery. The battery supplies electrical power to the wireless communication module.

Advantageous Effects of Invention

According to an embodiment of the present disclosure, a novel antenna, wireless communication module, and wireless communication device can be provided.

DESCRIPTION OF EMBODIMENTS

Figure 1:
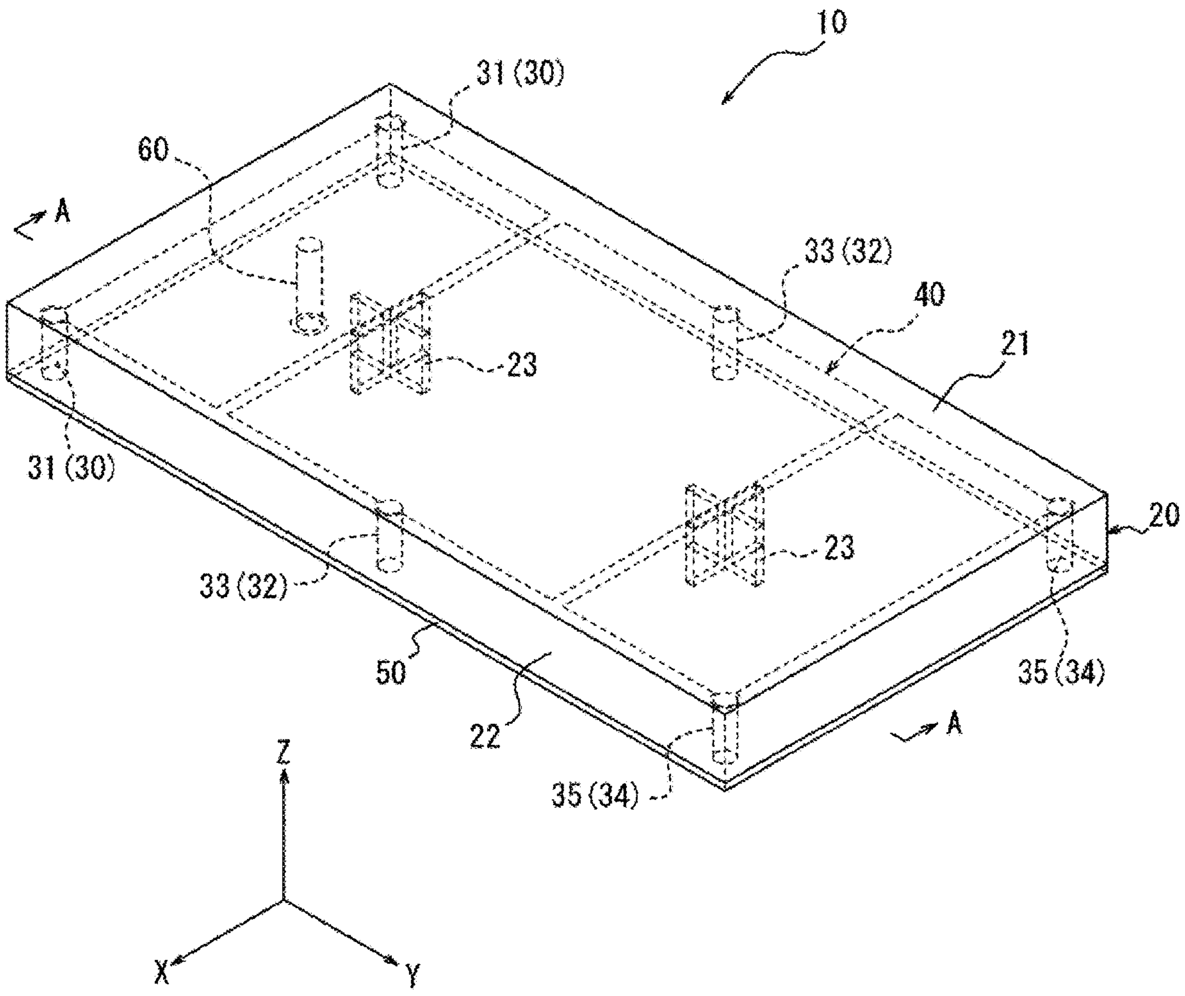
FIG. 1 is a perspective view of an antenna according to an embodiment of the present disclosure.

In the present disclosure, the "dielectric material" may include a composition of either a ceramic material or a resin material. Examples of the ceramic material include an aluminum oxide sintered body, an aluminum nitride sintered body, a mullite sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and a material yielded by curing an uncured material such as a liquid crystal polymer.

The "electrically conductive material" in the present disclosure may include a composition of any of a metal material, an alloy of metal materials, a cured metal paste, and a conductive polymer. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

Hereinafter, a plurality of embodiments of the present disclosure will be described with reference to the drawings. Of the components illustrated in FIGS. 1 to 39, the same components are denoted by the same reference signs.

In embodiments of the present disclosure, an XYZ coordinate system is employed. Hereinafter, In a case where the positive direction of the X axis and the negative direction of the X axis are not particularly distinguished from each other, the positive direction of the X axis and the negative direction of the X axis are collectively referred to as the "X direction". In a case where the positive direction of the Y axis and the negative direction of the Y axis are not particularly distinguished from each other, the positive direction of the Y axis and the negative direction of the Y axis are collectively referred to as the "Y direction". In a case where the positive direction of the Z axis and the negative direction of the Z axis are not particularly distinguished from each other, the positive direction of the Z axis and the negative direction of the Z axis are collectively referred to as the "Z direction".

Hereinafter, a first direction represents the X direction. A second direction represents the Y direction. A third direction represents the Z direction. A first plane represents an XY plane. However, the first direction may or may not be orthogonal to the second direction. It is only required that the first direction intersect the second direction. The third direction may or may not be orthogonal to the first plane. It is only required that the third direction intersect with the first plane.

Figure 2:
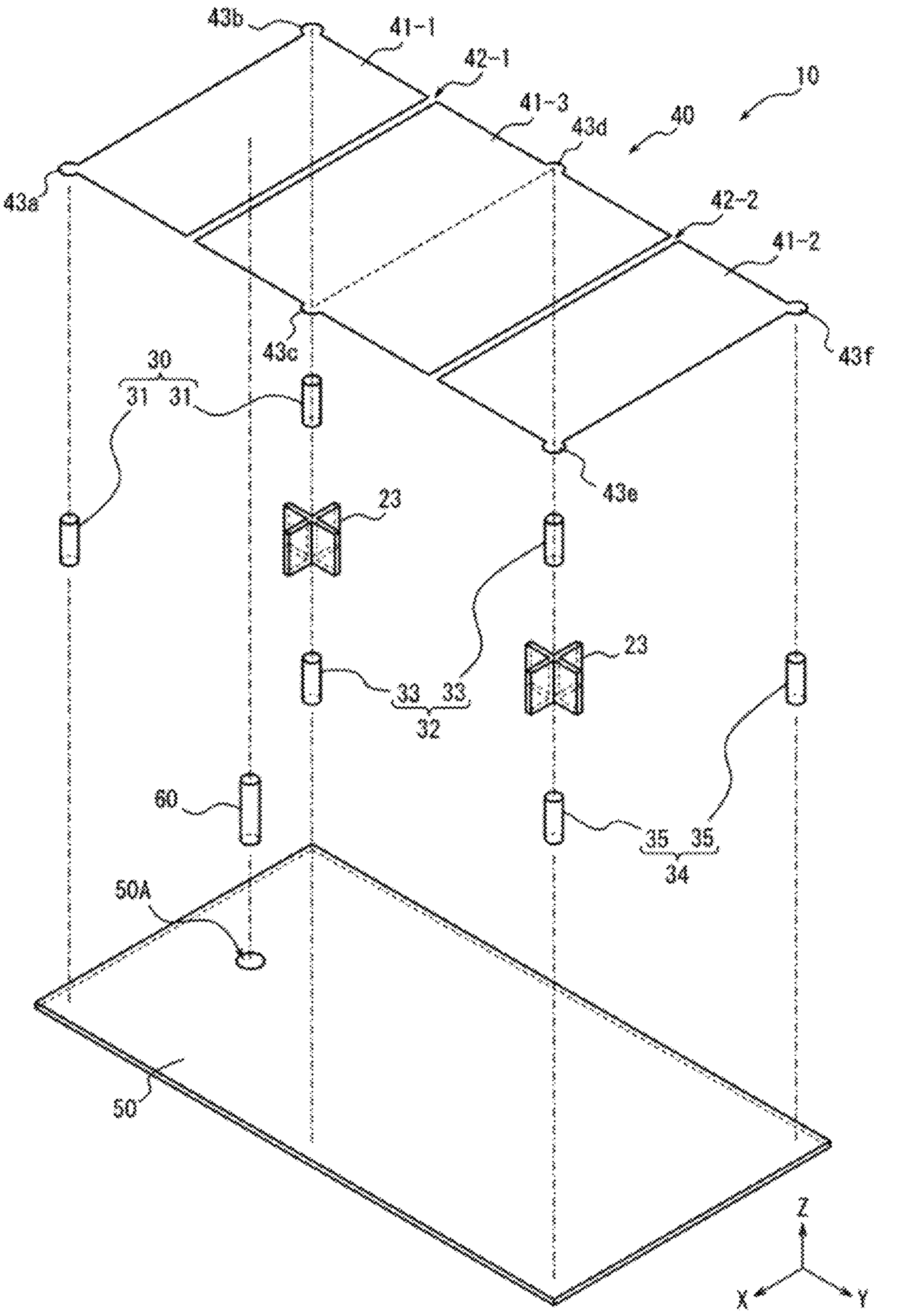
FIG. 2 is an exploded perspective view of a portion of the antenna illustrated in FIG. 1.
Figure 3:
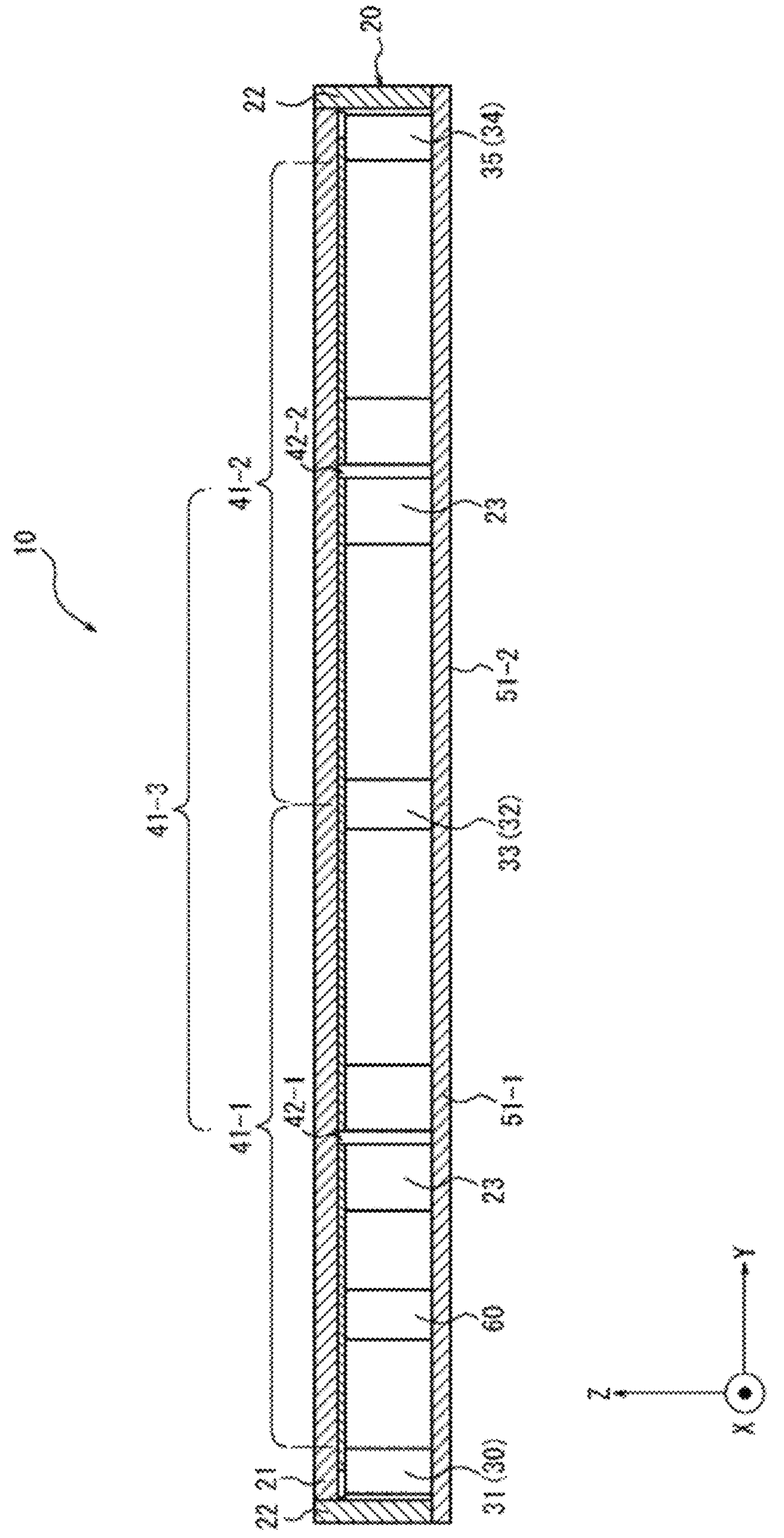
FIG. 3 is a cross-sectional view taken along line A-A of the antenna illustrated in FIG. 1.

FIG. 1 is a perspective view of an antenna 10 according to an embodiment of the present disclosure. FIG. 2 is an exploded perspective view of a portion of the antenna 10 illustrated in FIG. 1. FIG. 3 is a cross-sectional view taken along line A-A of the antenna 10 illustrated in FIG. 1.

As illustrated in FIG. 1 and FIG. 2, the antenna 10 includes a base 20, a first connection conductor group 30, a second connection conductor group 32, a third connection conductor group 34, a first conductor 40, a second conductor 50, and a feed line 60. The first connection conductor group 30, the second connection conductor group 32, the third connection conductor group 34, the first conductor 40, the second conductor 50, and the feed line 60 may include an identical conductive material or different conductive materials.

The antenna 10 can exhibit an artificial magnetic conductor character with respect to electromagnetic waves of a predetermined frequency that are incident from the outside on a surface including the first conductor 40.

In the present disclosure, the "artificial magnetic conductor character" means a characteristic of a surface having a phase difference of 0 degrees between incident waves and reflected waves at a resonant frequency. The antenna 10 may have an operating frequency in at least one vicinity of at least one resonant frequency. On a surface having the artificial magnetic conductor character, the phase difference between incident waves and reflected waves in an operating frequency band ranges from more than −90 degrees to less than +90 degrees.

The base 20 supports the first conductor 40. The outer appearance shape of the base 20 may be substantially rectangular in accordance with the shape of the first conductor 40. The base 20 may include a dielectric material. The relative permittivity of the base 20 may be adjusted as appropriate in accordance with the desired resonant frequency of the antenna 10.

As illustrated in FIG. 3, the base 20 includes an upper portion 21, a side wall portion 22, and two pillar portions 23. However, the base 20 may have one, or three or more pillar portions 23 in accordance with the size of the antenna 10 and the like. The base 20 may or may not have the pillar portions 23 depending on the size of the antenna 10 and the like.

The upper portion 21 extends along the XY plane. The upper portion 21 may have a substantially rectangular shape in accordance with the shape of the first conductor 40. However, the upper portion 21 may have any shape, provided that the upper portion 21 has a shape in accordance with the shape of the first conductor 40. The upper portion 21 includes two surfaces that are substantially parallel to the XY plane. One of the two surfaces included in the upper portion 21 faces an outer side of the base 20. The other faces an inner side of the base 20.

The side wall portion 22 surrounds an outer peripheral portion of the upper portion 21 having the substantially rectangular shape. The side wall portion 22 is connected to the outer peripheral portion of the upper portion 21. The side wall portion 22 extends from the outer peripheral portion of the upper portion 21 toward the second conductor 50 along the Z direction. The region surrounded by the upper portion 21 and the side wall portion 22 is a cavity. However, at least a portion of the region surrounded by the upper portion 21 and the side wall portion 22 may be filled with a dielectric material or the like.

The pillar portion 23 is located in the region surrounded by the upper portion 21 and the side wall portion 22. The pillar portion 23 is located between the first conductor 40 and the second conductor 50. The pillar portion 23 holds a gap between the first conductor 40 and the second conductor 50. Each of the two pillar portions 23 may hold the gap between the first conductor 40 and the second conductor 50 at different positions from each other. The pillar portion 23 may have a cross shape when viewed from the Z direction.

As illustrated in FIG. 2, the first connection conductor group 30 includes a plurality of first connection conductors 31. In the configuration illustrated in FIG. 2, the first connection conductor group 30 includes two of the first connection conductors 31. However, the first connection conductor group 30 may include any number of the first connection conductors 31 in accordance with, for example, the shape of the first conductor 40.

The plurality of first connection conductors 31 are aligned in the X direction. In a configuration in which the first connection conductor group 30 includes three or more of the first connection conductors 31, gaps between the plurality of first connection conductors 31 aligned in the X direction may be substantially equal. The first connection conductor 31 may be along the Z direction. The first connection conductor 31 may be a conductor having a columnar shape. The first connection conductor 31 may include one end electrically connected to the first conductor 40 and another end electrically connected to the second conductor 50.

The second connection conductor group 32 is aligned with the first connection conductor group 30 in the Y direction. The second connection conductor group 32 includes a plurality of second connection conductors 33. In the configuration illustrated in FIG. 2, the second connection conductor group 32 includes two of the second connection conductors 33. However, the second connection conductor group 32 may include any number of the second connection conductors 33 in accordance with, for example, the shape of the first conductor 40.

The plurality of second connection conductors 33 are aligned in the X direction. The gap between the second connection conductors 33 aligned in the X direction may be substantially equal to the gap between the first connection conductors 31 aligned in the X direction. The second connection conductor 33 may be along the Z direction. The second connection conductor 33 may be a conductor having a columnar shape. The second connection conductor 33 may include one end electrically connected to the first conductor 40 and another end electrically connected to the second conductor 50.

The third connection conductor group 34 is aligned with the first connection conductor group 30 and the second connection conductor group 32 in the Y direction. The third connection conductor group 34 includes a plurality of third connection conductors 35. In the configuration illustrated in FIG. 2, the third connection conductor group 34 includes two of the third connection conductors 35. However, the third connection conductor group 34 may include any number of the third connection conductors 35 in accordance with, for example, the shape of the first conductor 40.

The plurality of third connection conductors 35 are aligned in the X direction. The gap between the third connection conductors 35 aligned in the X direction may be substantially equal to at least one of the gap between the first connection conductors 31 aligned in the X direction or the gap between the second connection conductors 33 aligned in the X direction. The third connection conductor 35 may extend along the Z direction. The third connection conductor 35 may be a conductor having a columnar shape. The third connection conductor 35 may include one end electrically connected to the first conductor 40 and another end electrically connected to the second conductor 50.

The first conductor 40 functions as a resonator. The first conductor 40 may extend along the XY plane. The first conductor 40 is located on the upper portion 21 of the base 20. The first conductor 40 may be located on a surface facing the inner side of the base 20, the surface being one of the two surfaces substantially parallel to the XY plane included in the upper portion 21. The first conductor 40 may be a conductor having a flat plate shape. The first conductor 40 may have a substantially rectangular shape. The short side of the first conductor 40 having the substantially rectangular shape is along the X direction. The long side of the first conductor 40 having the substantially rectangular shape is along the Y direction.

The first conductor 40 includes a first conductive element 41-1, a second conductive element 41-2, and connecting portions 43*a*, 43*b*, 43*c*, 43*d*, 43*e*, 43*f*. However, the first conductor 40 may or may not include the connecting portions 43*a*, 43*b*, 43*c*, 43*d*, 43*e*, 43*f*. Hereinafter, in a case where the first conductive element 41-1 and the second conductive element 41-2 are not particularly distinguished from each other, these are collectively referred to as the "conductive element 41". The conductive element 41 and the connecting portions 43*a* to 43*f* may include an identical conductive material or different conductive materials.

The conductive element 41 may have a substantially rectangular shape. The conductive element 41 includes four corner portions. The conductive element 41 includes two sides along the X direction and two sides along the Y direction. The first conductive element 41-1 has a gap 42-1. The second conductive element 41-2 has a gap 42-2. Hereinafter, in a case where the gap 42-1 and the gap 42-2 are not particularly distinguished from each other, these are collectively referred to as the "gap 42". The gap 42 extends from a central portion of one of two sides of the conductive element 41 along the Y direction toward a central portion of the other side thereof. The gap 42 is along the X direction. A portion at or near the center of the gap 42 along the X-direction may include a portion of the pillar portion 23 on a Z axis positive direction side. The width of the gap 42 may be adjusted as appropriate in accordance with the desired operating frequency of the antenna 10.

The first conductive element 41-1 and the second conductive element 41-2 are aligned in the Y direction. One side along the X direction on a Y axis positive direction side of the first conductive element 41-1 is integrated with one side along the X direction on a Y axis negative direction side of the second conductive element 41-2 to form a third conductive element 41-3. Two of four corner portions of the first conductive element 41-1, the two being on the Y axis positive direction side, are integrated with two of four corner portions of the second conductive element 41-2, the two being on the Y axis negative direction side.

The connecting portions 43*a*, 43*b* are located at two corner portions of the first conductive element 41-1 on the Y axis negative direction side. The connecting portions 43*a*, 43*b* are each electrically connected to the first connection conductor 31. The connecting portions 43*a*, 43*b* may have a rounded shape in accordance with the first connection conductor 31. In a configuration in which the first conductor 40 does not include the connecting portions 43*a*, 43*b*, the two corner portions of the first conductive element 41-1 on the Y axis negative direction side may be each electrically connected directly to the first connection conductor 31.

The connecting portion 43*c* is located at or near the center on one of two long sides of the first conductor 40, the one being on an X axis positive direction side. The connecting portion 43*c* is located, on the X axis positive direction side, at a corner portion on the Y axis positive direction side of the first conductive element 41-1, the corner portion being integrated with a corner portion on the Y axis negative direction side of the second conductive element 41-2. The connecting portion 43*c* is electrically connected to the second connection conductor 33. The connecting portion 43*c* may have a rounded shape in accordance with the second connection conductor 33. In a configuration in which the first conductor 40 does not include the connecting portion 43*c*, the corner portion on the Y axis positive direction side of the first conductive element 41-1, the corner portion being integrated with the corner portion on the Y axis negative direction side of the second conductive element 41-2, may be electrically connected directly to the second connection conductor 33.

The connecting portion 43*d* is located at or near the center of one of two long sides of the first conductor 40, the one being on an X axis negative direction side. The connecting portion 43*d* is located, on the X axis negative direction side, at the corner portion on the Y axis positive direction side of the first conductive element 41-1, the corner portion integrated with the corner portion on the Y axis negative direction side of the second conductive element 41-2. The connecting portion 43*d* is electrically connected to the second connection conductor 33. The connecting portion 43*d* may have a rounded shape in accordance with the second connection conductor 33. In a configuration in which the first conductor 40 does not include the connecting portion 43*d*, the corner portion on the Y axis positive direction side of the first conductive element 41-1, the corner portion being integrated with the corner portion on the Y axis negative direction side of the second conductive element 41-2, may be electrically connected directly to the second connection conductor 33.

The connecting portions 43*e*, 43*f* are located at two corner portions on the Y axis positive direction side of the second conductive element 41-2. The connecting portions 43*e*, 43*f* are each electrically connected to the third connection conductor 35. The connecting portions 43*e*, 43*f* may have a rounded shape in accordance with the third connection conductor 35. In a configuration in which the first conductor 40 does not include the connecting portions 43*e*, 43*f*, the two corner portions on the Y axis positive direction side of the second conductive element 41-2 may be each electrically connected directly to the third connection conductor 35.

The first conductor 40 capacitively connects the first connection conductor group 30 and the second connection conductor group 32. For example, the first conductive element 41-1 is electrically connected to the first connection conductors 31 by the connecting portions 43*a*, 43*b* and to the second connection conductors 33 by the connecting portions 43*c*, 43*d*. The first connection conductor 31 and the second connection conductor 33 may be capacitively connected via the gap 42-1 of the first conductive element 41-1.

The first conductor 40 capacitively connects the second connection conductor group 32 and the third connection conductor group 34. For example, the second conductive element 41-2 is electrically connected to the second connection conductors 33 by the connecting portions 43*c*, 43*d* and to the third connection conductors 35 by the connecting portions 43*e*, 43*f*. The second connection conductor 33 and the third connection conductor 35 may be capacitively connected via the gap 42-2 of the second conductive element 41-2.

The first conductor 40 capacitively connects the first connection conductor group 30 and the third connection conductor group 34. For example, the first conductive element 41-1 is electrically connected to the first connection conductors 31 by the connecting portions 43*a*, 43*b*. The second conductive element 41-2 is electrically connected to the third connection conductors 35 by the connecting portions 43*e*, 43*f*. The first connection conductor group 30 and the third connection conductor group 34 may be capacitively connected via the gap 42-1 of the first conductive element 41-1 and the gap 42-2 of the second conductive element 41-2.

The second conductor 50 provides a reference potential in the antenna 10. The second conductor 50 may be electrically connected to the ground of a device including the antenna 10. As illustrated in FIG. 3, the second conductor 50 is located on a Z axis negative direction side of the base 20. A variety of parts of the device including the antenna 10 may be located on the Z axis negative direction side of the second conductor 50. The antenna 10, even with the variety of parts located on the Z axis negative direction side of the second conductor 50, can maintain radiation efficiency at the operating frequency by having the artificial magnetic conductor character described above.

As illustrated in FIG. 2, the second conductor 50 extends along the XY plane. The second conductor 50 may be a conductor having a flat plate shape. The second conductor 50 is separated from the first conductor 40 in the Z direction. The second conductor 50 may face the first conductor 40. The second conductor 50 may have a substantially rectangular shape in accordance with the shape of the first conductor 40. However, the second conductor 50 may also have any shape in accordance with the shape of the first conductor 40. The short side of the second conductor 50 having the substantially rectangular shape is along the X direction. The long side of the second conductor 50 having the substantially rectangular shape is along the Y direction. The second conductor 50 may have an opening portion 50A in accordance with the structure of the feed line 60.

The second conductor 50 includes a fourth conductor 51-1 and a fourth conductor 51-2. Hereinafter, in a case where the fourth conductor 51-1 and the fourth conductor 51-2 are not particularly distinguished from each other, these are collectively referred to as the "fourth conductor 51".

The fourth conductor 51 may have a substantially rectangular shape. The fourth conductor 51 having the substantially rectangular shape includes four corner portions. The fourth conductor 51-1 faces the first conductive element 41-1. The fourth conductor 51-2 faces the second conductive element 41-2. One side along the X direction on the Y axis positive direction side of the fourth conductor 51-1 is integrated with one side along the X direction on the Y axis negative direction side of the fourth conductor 51-2. Two of four corner portions of the fourth conductor 51-1, the two being on the Y axis positive direction side, are integrated with two of four corner portions of the fourth conductor 51-2, the two being on the Y axis negative direction side.

The second conductor 50 is electrically connected to the first connection conductor group 30. For example, two of four corner portions of the fourth conductor 51-1, the two being on the Y axis negative direction side, are each electrically connected to the first connection conductor 31.

The second conductor 50 is electrically connected to the second connection conductor group 32. For example, on each of the X axis positive direction side and the X axis negative direction side, a corner portion on the Y axis positive direction side of the fourth conductor 51-1, the corner portion being integrated with a corner portion on the Y axis negative direction side of the fourth conductor 51-2, is electrically connected to the second connection conductor 33.

The second conductor 50 is electrically connected to the third connection conductor group 34. For example, two of four corner portions of the fourth conductor 51-2, the two being on the Y axis positive direction side, are each electrically connected to the third connection conductor 35.

A portion of the feed line 60 is along the Z direction. The feed line 60 may be a conductor having a columnar shape. A portion of the feed line 60 may be located in the region surrounded by the upper portion 21 and the side wall portion 22.

The feed line 60 is electrically connected to the first conductor 40. In the present disclosure, an "electromagnetic connection" may be an electrical connection or a magnetic connection. For example, one end of the feed line 60 may be electrically connected to the first conductor 40. Another end of the feed line 60 may extend externally from the opening portion 50A of the second conductor 50 illustrated in FIG. 2. The other end of the feed line 60 may be electrically connected to an external device or the like.

The feed line 60 supplies electrical power to the first conductor 40. The feed line 60 supplies electrical power from the first conductor 40 to an external device or the like.

Figure 4:
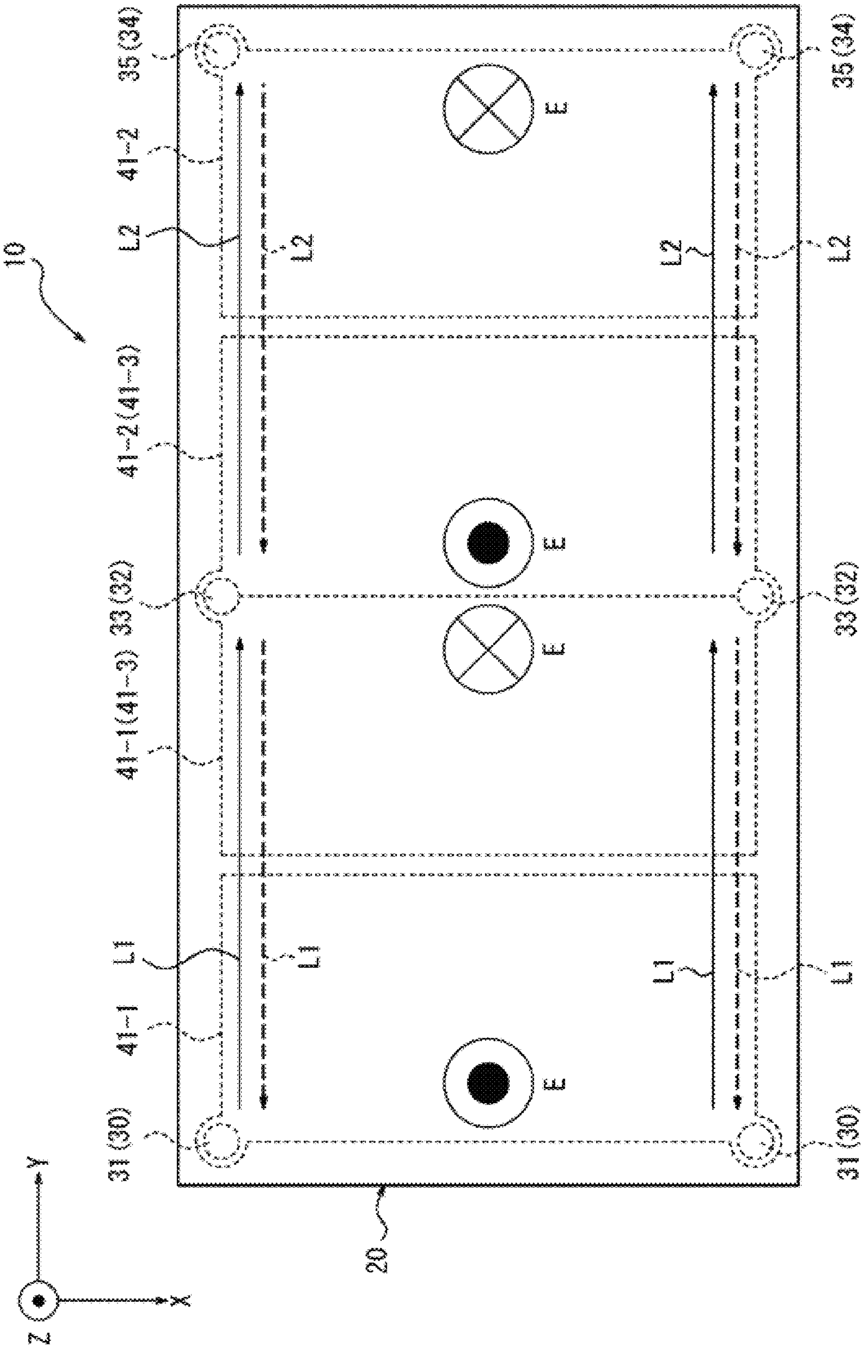
FIG. 4 is a plan view schematically illustrating electrical currents and electric fields when electromagnetic waves in a first frequency band are emitted.
Figure 5:
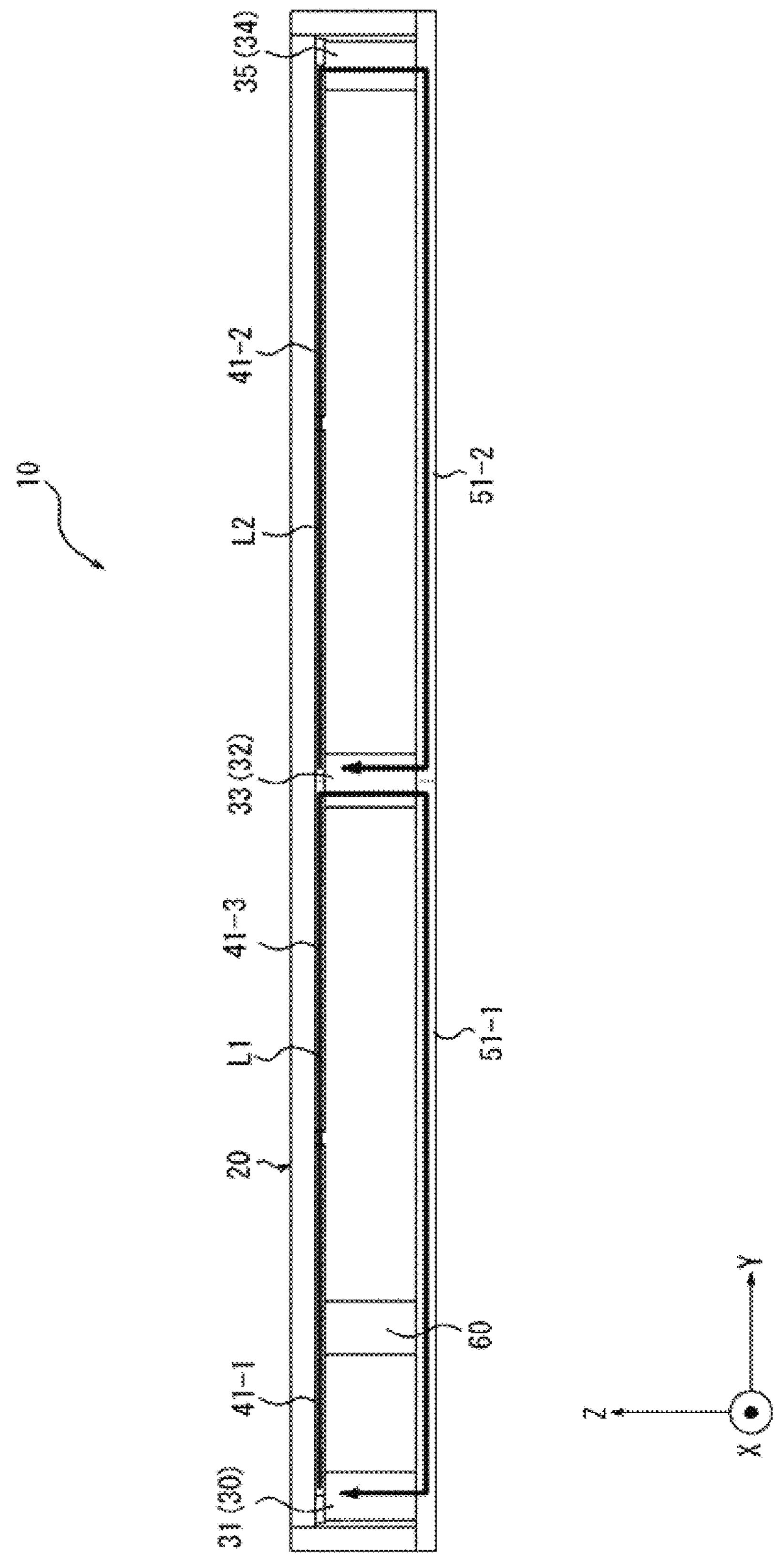
FIG. 5 is a cross-sectional view of the state illustrated in FIG. 4.

FIG. 4 is a plan view schematically illustrating electrical currents L1, L2 and electric fields E when electromagnetic waves in a first frequency band are emitted. FIG. 4 illustrates the orientations of the electric fields E viewed from the Z axis positive direction side at a given moment. In FIG. 4, solid lines indicating the electrical currents L1, L2 represent the orientations of the electrical currents flowing through the first conductor 40 at a given moment when viewed from the Z axis positive direction side. Dotted lines indicating the electrical currents L1, L2 represent the orientations of the electrical currents flowing through the second conductor 50 at a given moment when viewed from the Z axis positive direction side. FIG. 5 is a cross-sectional view of the state illustrated in FIG. 4.

Electrical power may be supplied as appropriate from the feed line 60 to the first conductor 40 to excite the electrical current L1 and the electrical current L2. The antenna 10 emits electromagnetic waves in the first frequency band by the electrical current L1 and the electrical current L2. The first frequency band is one of operating frequency bands of the antenna 10.

The electrical current L1 may be a loop electrical current flowing along a first loop. The solid lines indicating the electrical current L1 represent the orientations of the electrical currents flowing through the first conductor 40 to the positive direction of the Y axis at a given moment when viewed from the Z axis positive direction side along the first loop. The dotted lines indicating the electrical current L1 represent the orientations of the electrical currents flowing through the second conductor 50 to the negative direction of the Y axis at a given moment when viewed from the Z axis positive direction side along the first loop. The first loop may include the first connection conductor group 30, the second connection conductor group 32, the first conductor 40, and the second conductor 50. For example, the first loop may include the first connection conductors 31, the second connection conductors 33, the first conductive element 41-1, and the fourth conductor 51-1.

The electrical current L2 may be a loop electrical current flowing along a second loop. The solid lines indicating the electrical current L2 represent the orientations of the electrical currents flowing through the first conductor 40 to the positive direction of the Y axis at a given moment when viewed from the Z axis positive direction side along the second loop. The dotted lines indicating the electrical current L2 represent the orientations of the electrical currents flowing through the second conductor 50 to the negative direction of the Y axis at a given moment when viewed from the Z axis positive direction side along the second loop. The second loop may include the second connection conductor group 32, the third connection conductor group 34, the first conductor 40, and the second conductor 50. For example, the second loop may include the second connection conductors 33, the third connection conductors 35, the second conductive element 41-2, and the fourth conductor 51-2.

The orientations of the electrical current L1 and the electrical current L2 that each flow through one of corresponding portions in the first loop and the second loop may be the same. For example, the second connection conductor 33 included in the first loop and the third connection conductor 35 included in the second loop are corresponding portions. As illustrated in FIG. 5, the orientation of the electrical current L1 (indicated by solid lines) flowing through the second connection conductor 33 included in the first loop and the orientation of the electrical current L2 (indicated by solid lines) flowing through the third connection conductor 35 included in the second loop may be, at a given moment, the same Z axis negative direction. The first connection conductor 31 included in the first loop and the second connection conductor 33 included in the second loop are also corresponding portions. The orientation of the electrical current L1 flowing through the first connection conductor 31 included in the first loop and the orientation of the electrical current L2 flowing through the second connection conductor 33 included in the second loop may be, at a given moment, the same Z axis positive direction.

When the orientations of the electrical current L1 and the electrical current L2, which each flow through one of the corresponding portions in the first loop and the second loop, are the same, the orientation of the electrical current L1 flowing through the second connection conductor 33 in the first loop and the orientation of the electrical current L2 flowing through the second connection conductor 33 of the second loop may be opposite each other. For example, when the orientation of the electrical current L1 flowing through the second connection conductor 33 included in the first loop is the Z axis negative direction, the orientation of the electrical current L2 flowing through the second connection conductor 33 included in the second loop may be the Z axis positive direction. When the orientations of the electrical current L1 (indicated by solid lines, for example) and the electrical current L2 (indicated by dotted lines, for example) that flow through the second connection conductor 33 are opposite each other, as illustrated in FIG. 4, the orientation, at or near the second connection conductor group 32, of the electric field generated by the electrical current L1 and the orientation, at or near the second connection conductor group 32, of the electric field generated by the electrical current L2 may be opposite each other. Due to the opposite orientations of the two electric fields, the electric field, at or near the second connection conductor group 32, generated by the electrical current L1 and the electric field, at or near the second connection conductor group 32, generated by the electrical current L2 may offset each other when viewed macroscopically.

When the orientations of the electrical current L1 (indicated by solid lines in FIG. 4, for example) and the electrical current L2 (indicated by solid lines in FIG. 4, for example) that each flow through one of the corresponding portions in the first loop and the second loop are the same, the electrical current L1 and the electrical current L2 may be viewed as one macroscopic loop electrical current. This macroscopic loop electrical current may be viewed as flowing along a loop including the first connection conductor group 30, the third connection conductor group 34, the first conductor 40, and the second conductor 50. This macroscopic loop electrical current may generate electric fields having opposite orientations at or near the first connection conductor group 30 and at or near the third connection conductor group 34. For example, as illustrated in FIG. 4, when the orientation of the electric field at or near the first connection conductor group 30 is the Z axis positive direction, the orientation of the electric field at or near the third connection conductor group 34 may be the Z axis negative direction.

The macroscopic loop electrical current may cause the first connection conductor group 30 and the third connection conductor group 34 to function as a pair of electrical walls when viewed from the first conductor 40 as a resonator. Further, the macroscopic loop electrical current may cause a YZ plane on the X axis positive direction side and a YZ plane on the X axis negative direction side to function as a pair of magnetic walls when viewed from the first conductor 40 as a resonator. With the first conductor 40 surrounded by the pair of electrical walls and the pair of magnetic walls, the antenna 10 exhibits the artificial magnetic conductor character with respect to electromagnetic waves in the first frequency bandwidth that are incident from the outside on the first conductor 40.

Figure 6:
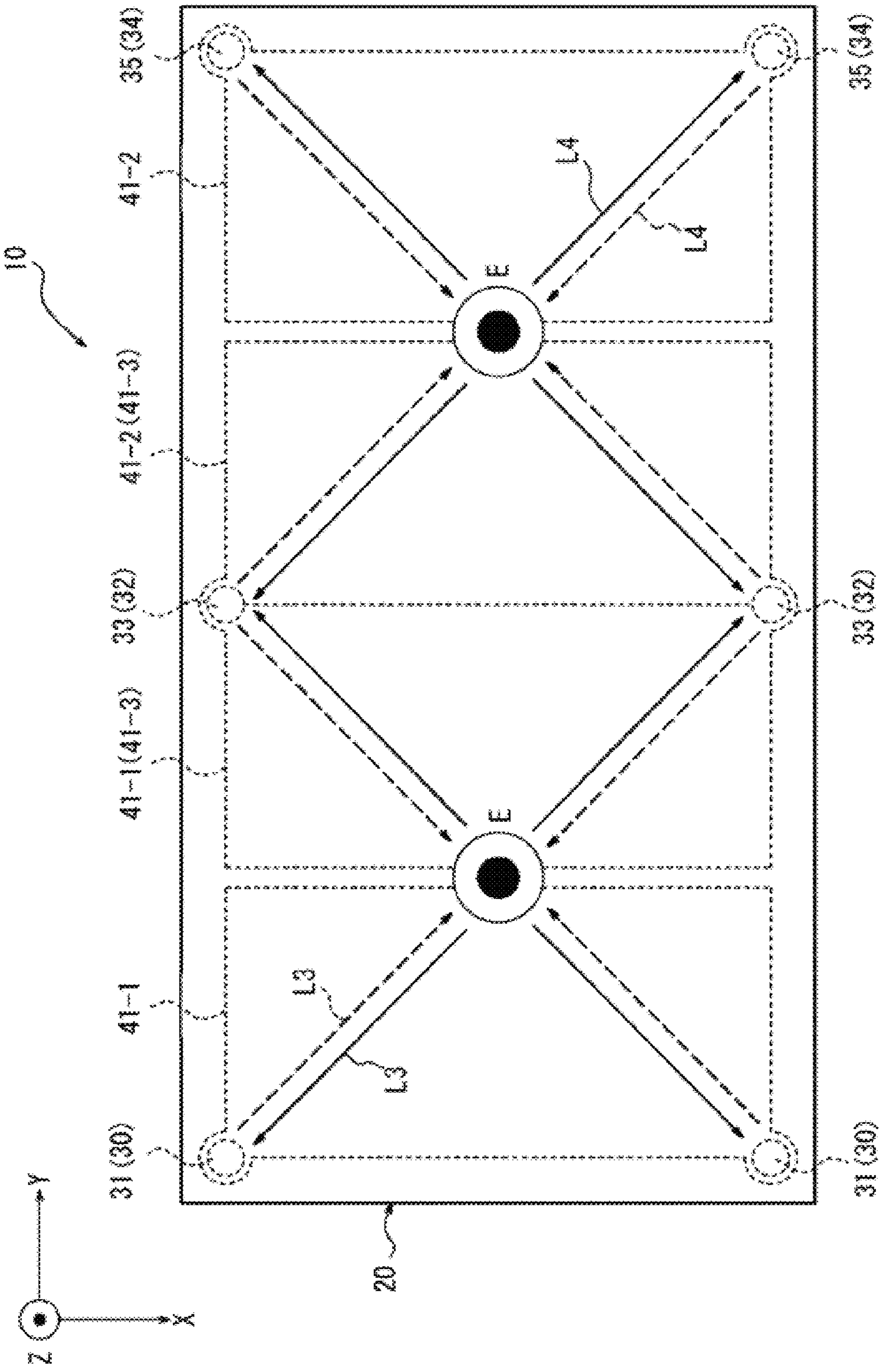
FIG. 6 is a plan view schematically illustrating electrical currents and electric fields when electromagnetic waves in a second frequency band are emitted.
Figure 7:
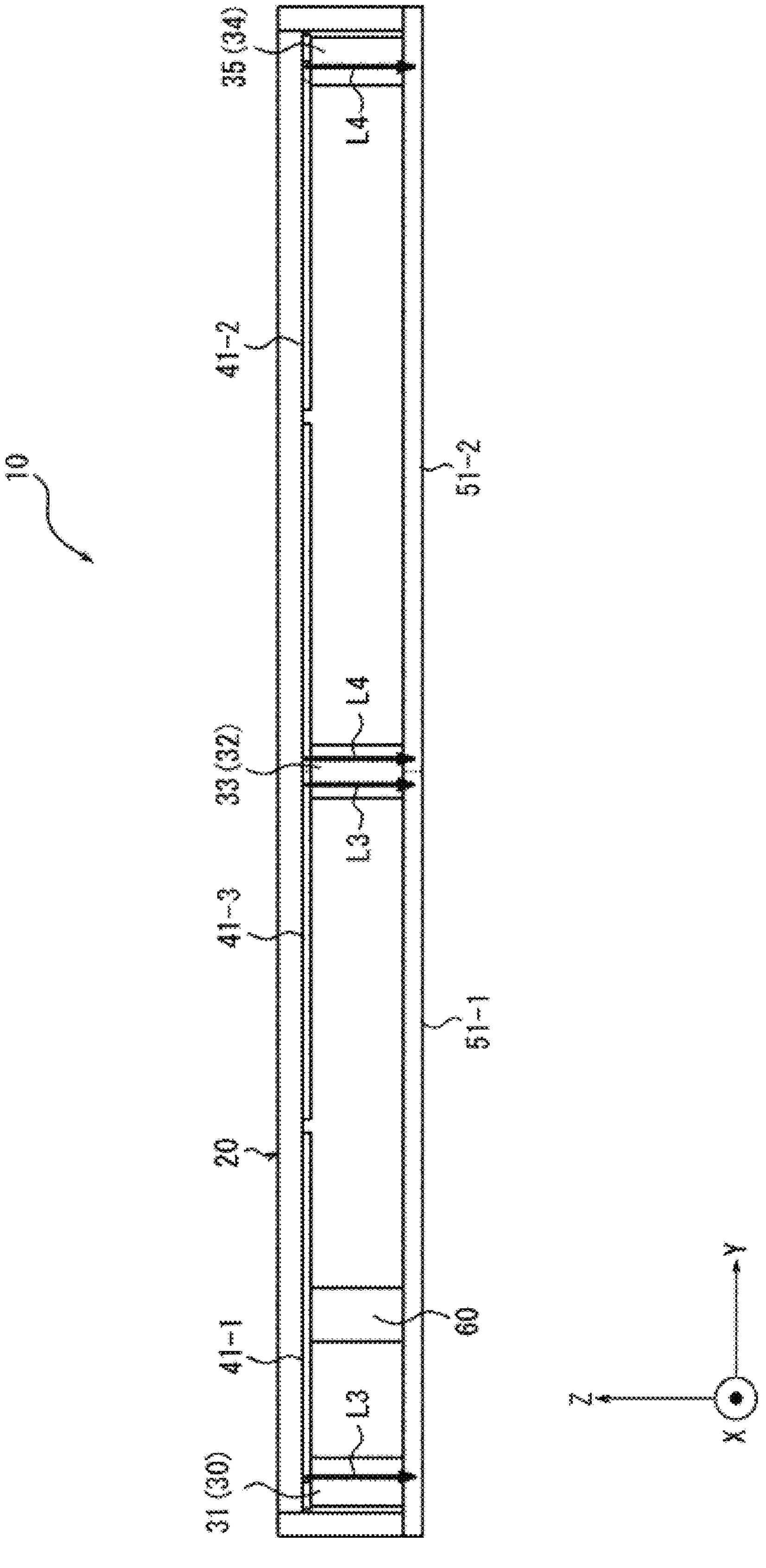
FIG. 7 is a cross-sectional view of the state illustrated in FIG. 6.

FIG. 6 is a plan view schematically illustrating electrical currents L3, L4 and the electric fields E when electromagnetic waves in a second frequency band are emitted. FIG. 6 illustrates the orientations of the electric fields E viewed from the Z axis positive direction side at a given moment. In FIG. 6, solid lines indicating electrical currents L3, L4 represent the orientations of the electrical currents flowing through the first conductor 40 at a given moment when viewed from the Z axis positive direction side. Dotted lines indicating the electrical currents L3, L4 represent the orientations of the electrical currents flowing through the second conductor 50 at a given moment when viewed from the Z axis positive direction side. FIG. 7 is a cross-sectional view of the state illustrated in FIG. 6.

Electrical power may be supplied as appropriate from the feed line 60 to the first conductor 40 to excite the electrical current L3 and the electrical current L4 in the second frequency band. The second frequency band may be one of the operating frequency bands of the antenna 10. Frequencies belonging to the second frequency band are higher than frequencies belonging to the first frequency band.

The electrical current L3 (indicated by solid lines) may flow through the first conductive element 41-1 at a given moment from a central region of the first conductive element 41-1 toward four corner portions of the first conductive element 41-1. The electrical current L3 (indicated by dotted lines) may flow through the first conductive element 41-1 at a different moment from the four corner portions of the first conductive element 41-1 toward the central region of the first conductive element 41-1.

The electrical current L3 (indicated by dotted lines) may flow through the fourth conductor 51-1 at a given moment from four corner portions of the fourth conductor 51-1 toward a central region of the fourth conductor 51-1. The electrical current L3 (indicated by solid lines) may flow through the fourth conductor 51-1 at a different moment from the central region of the fourth conductor 51-1 toward the four corner portions of the fourth conductor 51-1.

The orientation of the electrical current L3 flowing through the first connection conductor 31 and the orientation of the electrical current L3 flowing through the second connection conductor 33 may be the same. For example, as illustrated in FIG. 7, at a moment when the orientation of the electrical current L3 flowing through the first connection conductor 31 is the Z axis negative direction, the orientation of the electrical current L3 flowing through the second connection conductor 33 may be the Z axis negative direction. At a different moment when the orientation of the electrical current L3 flowing through the first connection conductor 31 is the Z axis positive direction, the orientation of the electrical current L3 flowing through the second connection conductor 33 may be the Z axis positive direction.

The first conductive element 41-1, the fourth conductor 51-1, the first connection conductors 31, and the second connection conductors 33 may constitute a first dielectric resonator. The first dielectric resonator may, with the electrical current L3 excited, resonate in a traverse magnetic (TM) mode, which is a resonant mode of a dielectric resonator.

The electrical current L4 may flow through the second conductive element 41-2 at a given moment from a central region of the second conductive element 41-2 toward four corner portions of the second conductive element 41-2. The electrical current L4 may flow through the second conductive element 41-2 at a different moment from the four corner portions of the second conductive element 41-2 toward the central region of the second conductive element 41-2.

The electrical current L4 may flow through the fourth conductor 51-2 at a given moment from four corner portions of the fourth conductor 51-2 toward a central region of the fourth conductor 51-2. The electrical current L4 may flow through the fourth conductor 51-2 at a different moment from the central region of the fourth conductor 51-2 toward the four corner portions of the fourth conductor 51-2.

The orientation of the electrical current L4 flowing through the second connection conductor 33 and the orientation of the electrical current L4 flowing through the third connection conductor 35 may be the same. For example, as illustrated in FIG. 7, at a moment when the orientation of the electrical current L4 (indicated by solid lines) flowing through the second connection conductor 33 is the Z axis negative direction, the orientation of the electrical current L4 (indicated by solid lines) flowing through the third connection conductor 35 may be the Z axis negative direction. At a different moment when the orientation of the electrical current L4 flowing through the second connection conductor 33 is the Z axis positive direction, the orientation of the electrical current L4 flowing through the third connection conductor 35 may be the Z axis positive direction.

The second conductive element 41-2, the fourth conductor 51-2, the second connection conductors 33, and the third connection conductors 35 may constitute a second dielectric resonator. The second dielectric resonator may, with the electrical current L4 excited, resonate in the TM mode, which is a resonant mode of a dielectric resonator.

The antenna 10 emits electromagnetic waves in the second frequency band, with the orientation of the electrical current flowing through the first connection conductor group 30, the orientation of the electrical current flowing through the second connection conductor group 32, and the orientation of the electrical current flowing through the third connection conductor group 34 being the same. For example, the orientation of the electrical current L3 flowing through the first connection conductor 31 and the second connection conductor 33 and the orientation of the electrical current L4 flowing through the second connection conductor 33 and the third connection conductor 35 may be the same.

In such a configuration, the orientation, on the first conductive element 41-1, of the electric field generated by the electrical current L3 and the orientation, on the second conductive element 41-2, of the electric field generated by the electrical current L4 may be the same in the second frequency bandwidth.

The antenna 10 serves as a dielectric resonator antenna in the second frequency band. In the second frequency band, the first dielectric resonator and the second dielectric resonator may resonate in a TM mode of dielectric resonators in the same phase.

Figure 8:
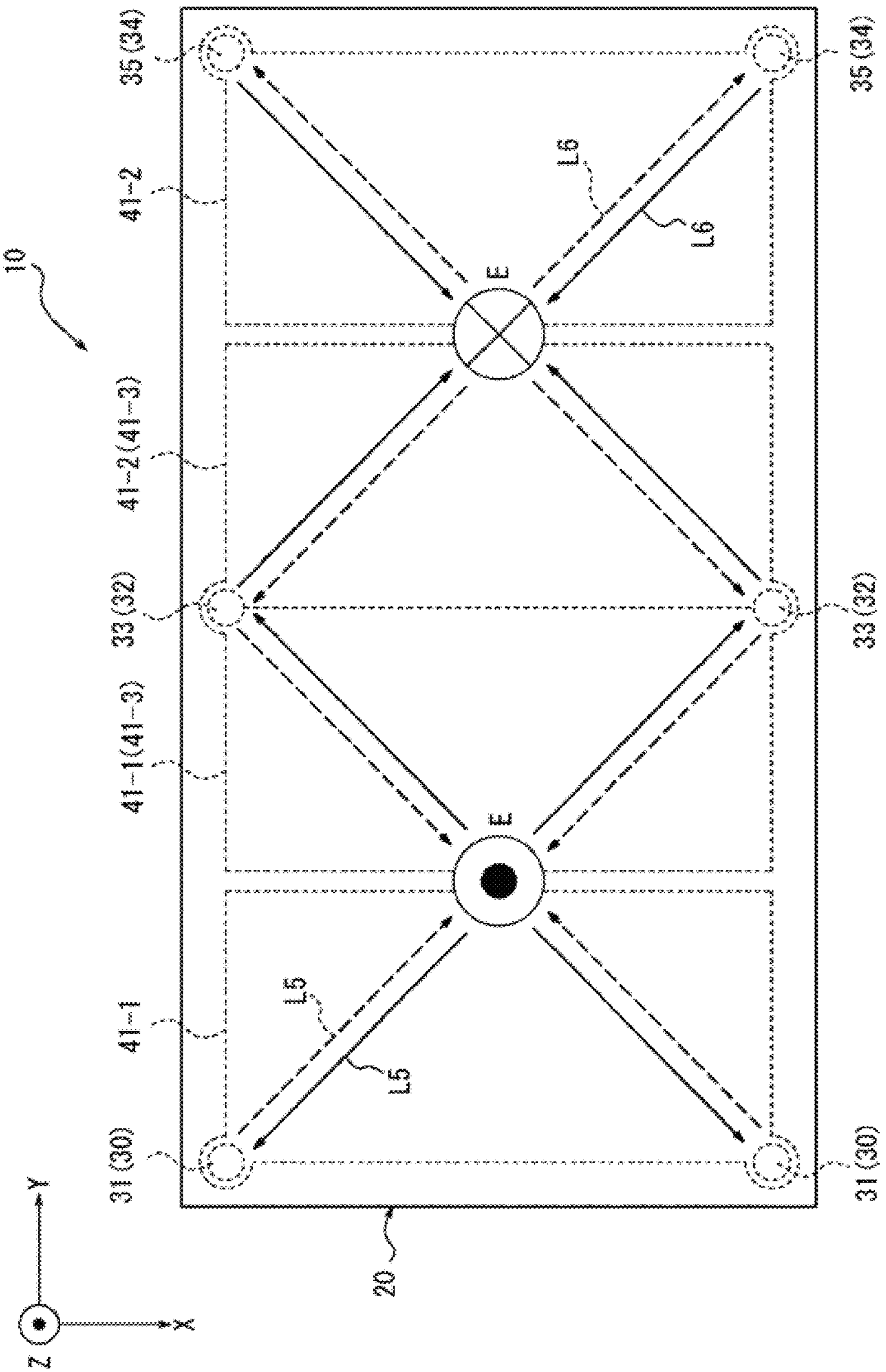
FIG. 8 is a plan view schematically illustrating electrical currents and electric fields when electromagnetic waves in a third frequency band are emitted.
Figure 9:
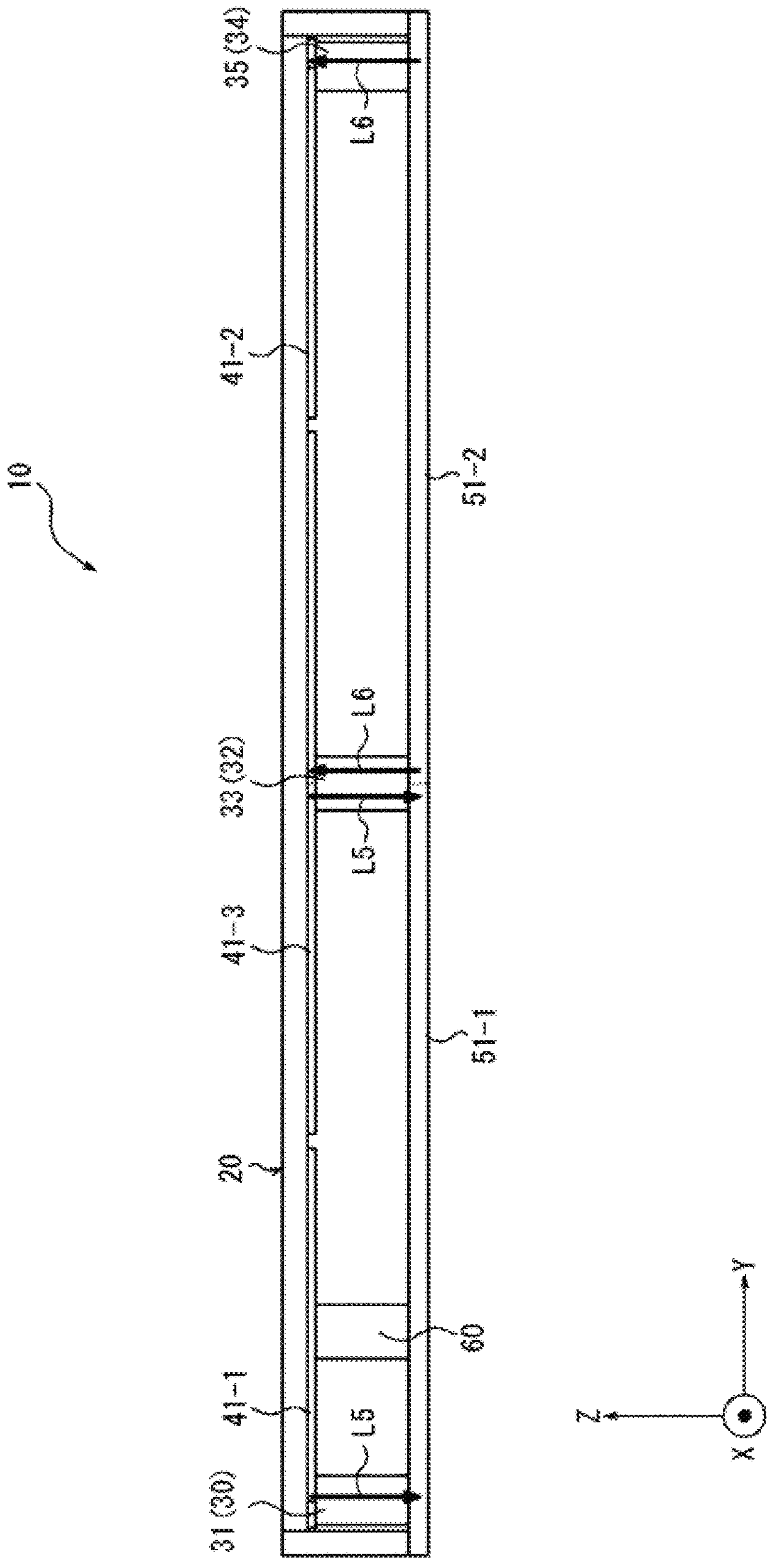
FIG. 9 is a cross-sectional view of the state illustrated in FIG. 8.

FIG. 8 is a plan view schematically illustrating electrical currents L5, L6, and the electric fields E when electromagnetic waves in the third frequency band are emitted. FIG. 8 illustrates the orientations of the electric fields E at a given moment when viewed from the Z axis positive direction. In FIG. 8, solid lines indicating electrical currents L5 and L6 represent the orientations of the electrical currents flowing through the first conductor 40 at a given moment when viewed from the Z axis positive direction side. Dotted lines indicating the electrical currents L5 and L6 represent the orientations of the electrical currents flowing through the second conductor 50 at a given moment when viewed from the Z axis positive direction side. FIG. 9 is a cross-sectional view of the state illustrated in FIG. 8.

Electrical power may be supplied as appropriate from the feed line 60 to the first conductor 40 to excite the electrical current L5 and the electrical current L6 in the third frequency band. The third frequency band is one of the operating frequency bands of the antenna 10. Frequencies belonging to the third frequency band are higher than the frequencies belonging to the first frequency band. The third frequency band may be higher than the second frequency band depending on the configuration of the antenna 10 or the like.

As with the electrical current L3 illustrated in FIG. 6, the electrical current L5 may flow through the first conductive element 41-1, the fourth conductor 51-1, the first connection conductors 31, and the second connection conductors 33. The first dielectric resonator may, with the electrical current L5 excited, may resonate in the TM mode, which is a resonant mode of a dielectric resonator.

As with the electrical current L4 illustrated in FIG. 6, the electrical current L6 may flow through the second conductive element 41-2, the fourth conductor 51-2, the second connection conductors 33, and the third connection conductors 35. However, the orientation of the electrical current L6 (indicated by solid lines in FIG. 8, for example) flowing through the second connection conductor 33 and the third connection conductor 35 and the orientation of the electrical current L5 (indicated by solid lines in FIG. 8, for example) flowing through the first connection conductor 31 and the second connection conductor 33 are opposite each other. The second dielectric resonator may, with the electrical current L6 excited, resonate in a TM mode in an opposite phase from the first dielectric resonator.

The antenna 10 emits electromagnetic waves in the third frequency band, with the orientation of the electrical current flowing through the first connection conductor group 30 and the orientation of the electrical current flowing through the third connection conductor group 34 being opposite each other. For example, the orientation of the electrical current L5 (indicated by solid lines in FIG. 9) flowing through the first connection conductor 31 and the second connection conductor 33 and the orientation of the electrical current L6 (indicated by solid lines in FIG. 9) flowing through the second connection conductor 33 and the third connection conductor 35 may be opposite each other. In such a configuration, the orientation of the electric field, on the first conductive element 41-1, generated by the electrical current L5 and the orientation of the electric field, on the second conductive element 41-2, generated by the electrical current L6 may be opposite each other.

The antenna 10 serves as a dielectric resonator antenna in the third frequency band. In the third frequency band, the first dielectric resonator and the second dielectric resonator may resonate in a TM mode of dielectric resonators in an opposite phase from each other.

Simulation Results

Figure 10:
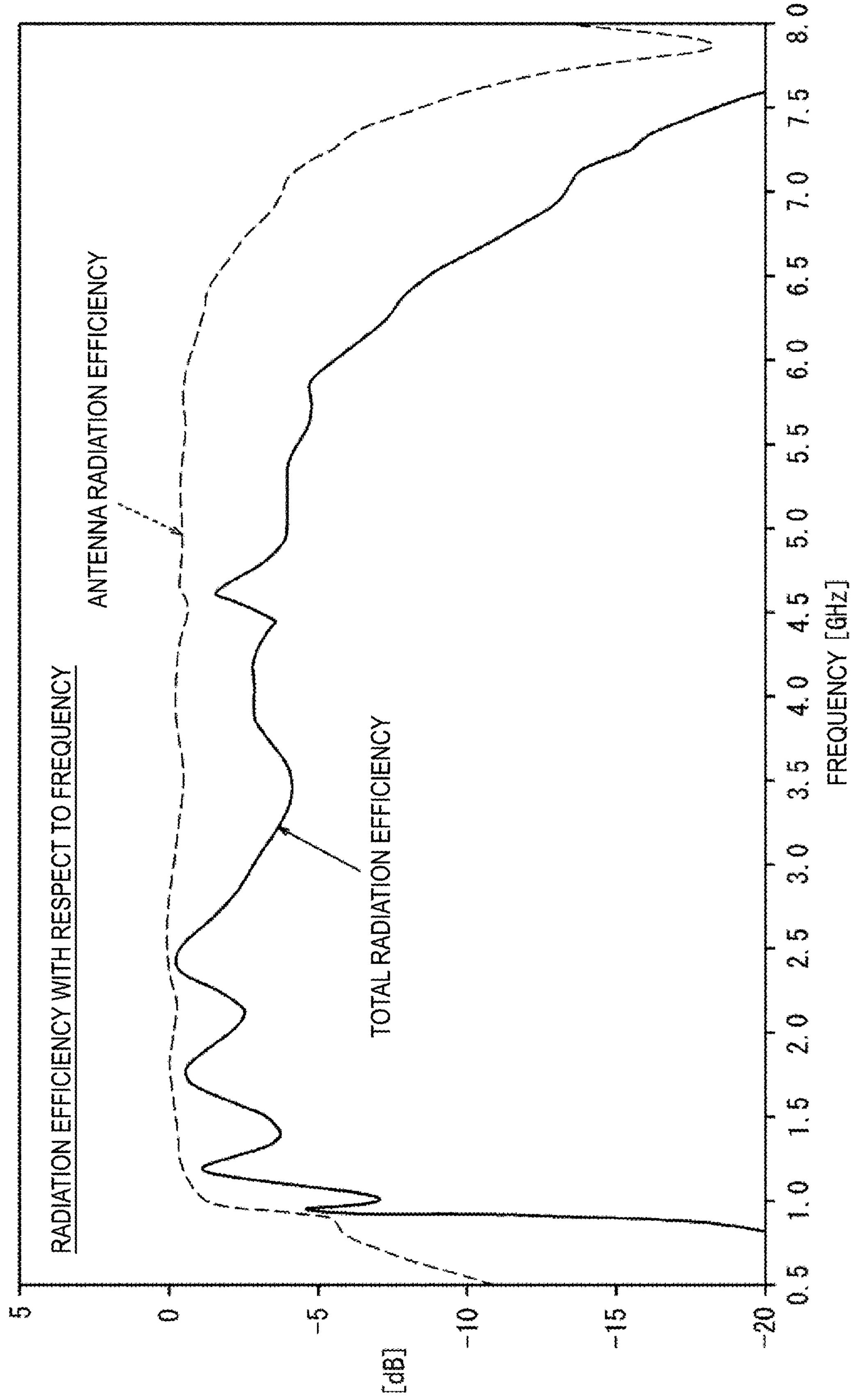
FIG. 10 is a graph showing the radiation efficiency, with respect to frequency, of the antenna illustrated in FIG. 1.

FIG. 10 is a graph showing the radiation efficiency, with respect to frequency, of the antenna 10 illustrated in FIG. 1. The data shown in FIG. 10 was acquired by a simulation. In the simulation, the length of the antenna 10 in the X direction was 54.3 mm, the length of the antenna 10 in the Y direction was 101.9 mm, and the height of the antenna 10 in the Z direction was 9.5 mm. The thickness of the upper portion 21 of the base 20 was 1.5 mm. The length of the first conductor 40 in the X direction was 47.6 mm, and the length of the first conductor 40 in the Y direction was 95.2 mm. The length of the second conductor 50 in the X direction was 54.3 mm, the length of the second conductor 50 in the Y direction was 101.9 mm, and the thickness of the second conductor in the Z direction 50 was 1.0 mm. The lengths, in the Z direction, of the first connection conductor 31, the second connection conductor 33, and the third connection conductor 35 were set to 7 mm. The antenna 10 was disposed on a metal conductor such that the second conductor 50 faces the metal conductor. The size of the metal conductor was 300 mm×300 mm.

The solid line indicates total radiation efficiency with respect to frequency. The total radiation efficiency is the ratio of the electrical power of electromagnetic waves emitted from the antenna 10 in all radiation directions, with respect to the electrical power supplied to the antenna 10, including the reflection loss. The dotted line indicates antenna radiation efficiency. The antenna radiation efficiency is the ratio of the electrical power of electromagnetic waves emitted from the antenna 10 in all radiation directions, with respect to the electrical power supplied to the antenna 10, excluding the reflection loss.

In the simulation, a frequency bandwidth having a total radiation efficiency exceeding −7 [dB (decibels)] was evaluated. The total radiation efficiency indicates that the antenna 10 is available in a broad band including frequency bands of from 0.9 [GHz (gigahertz)] to 1.0 [GHz] and from 1.1 [GHz] to 6.2 [GHz].

Figure 11:
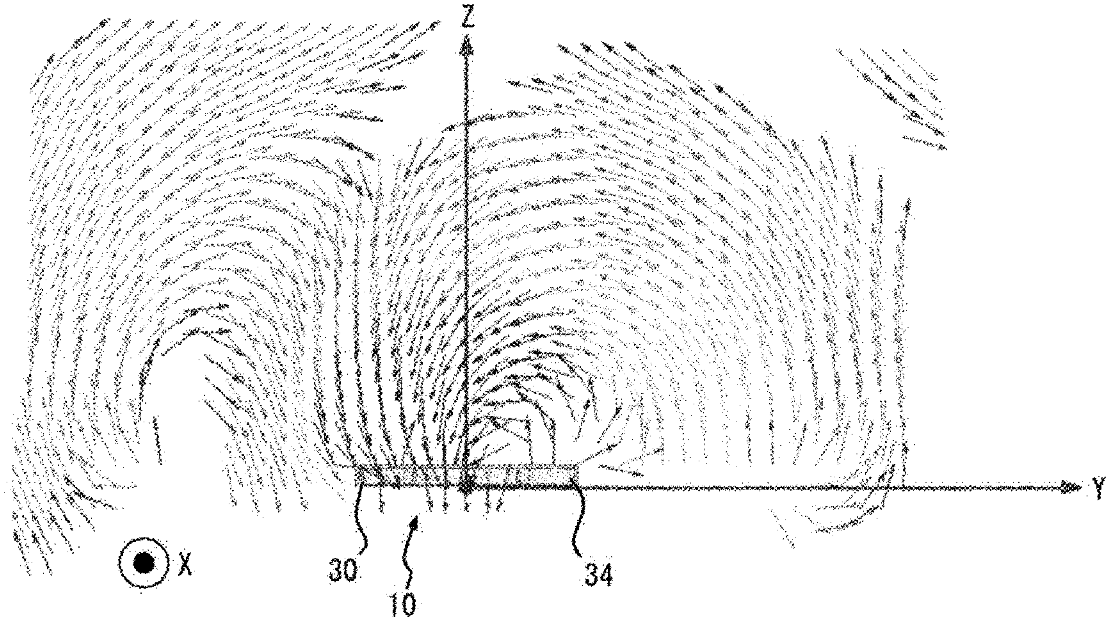
FIG. 11 is a diagram illustrating the electric field distribution of the antenna illustrated in FIG. 1 at a frequency of 0.96 [GHz].
Figure 12:
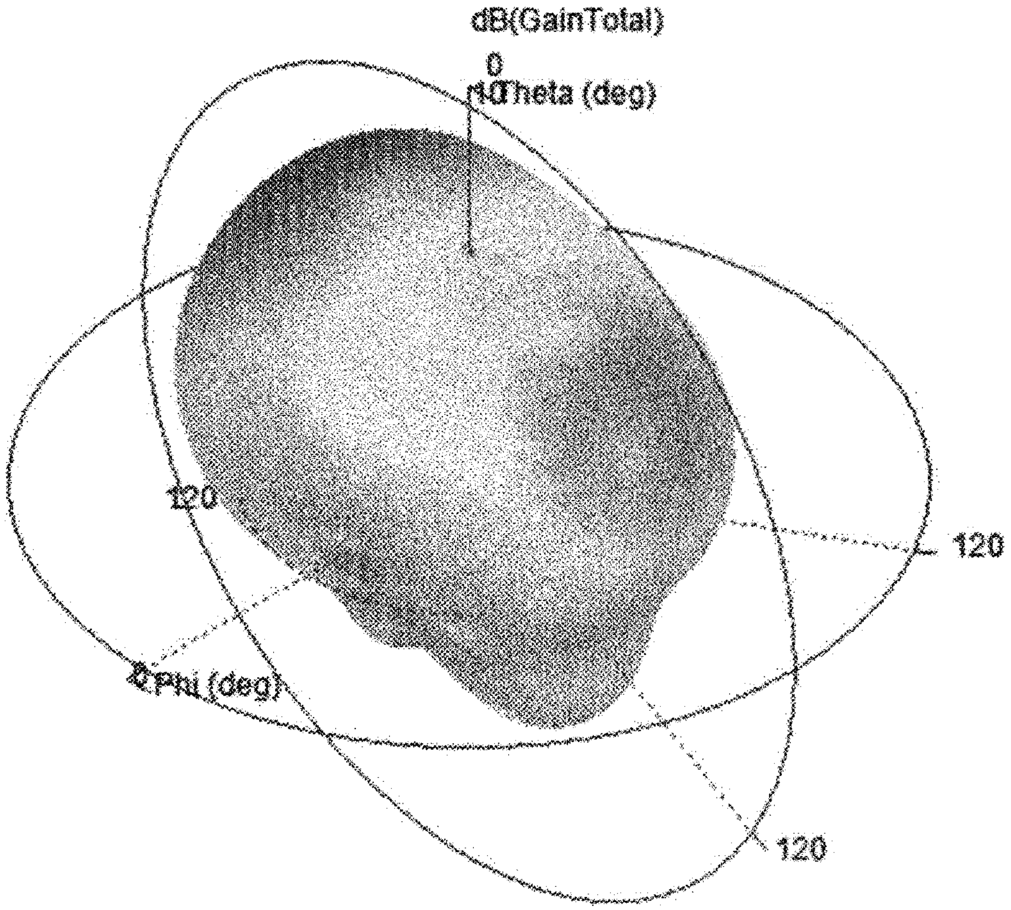
FIG. 12 is a diagram illustrating the radiation pattern of the antenna illustrated in FIG. 1 at the frequency of 0.96 [GHz].

FIG. 11 illustrates the electric field distribution of the antenna 10 at a frequency of 0.96 [GHz]. FIG. 12 illustrates the radiation pattern of the antenna 10 at the frequency of 0.96 [GHz]. As illustrated in FIG. 11, at the frequency of 0.96 [GHz], the electric field is directed from the third connection conductor group 34 toward the first connection conductor group 30 on the Z axis positive direction side. That is, the frequency of 0.96 [GHz] is part of the first frequency band.

Figure 13:
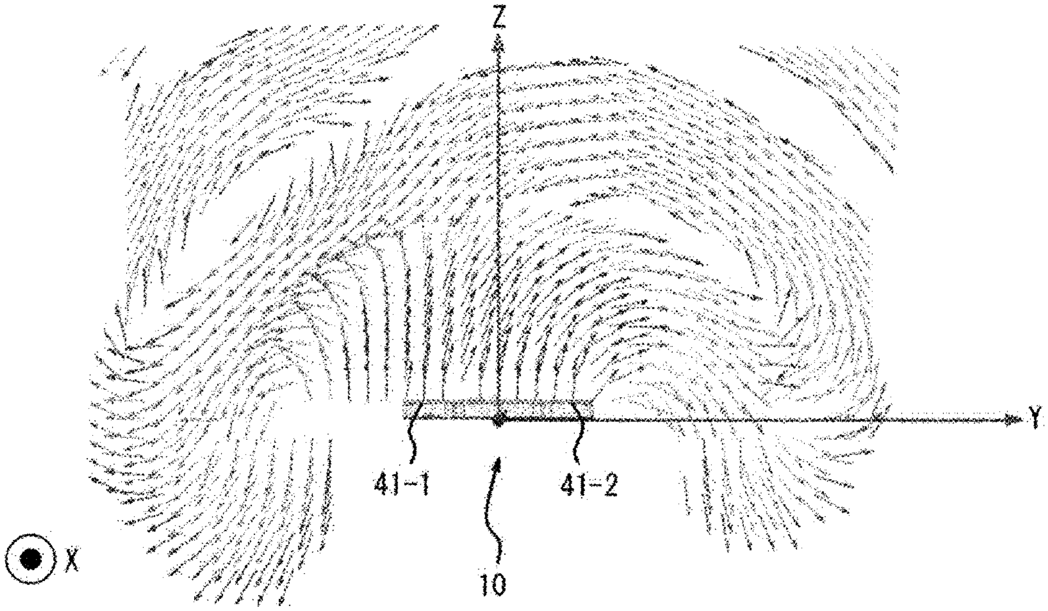
FIG. 13 is a diagram illustrating the electric field distribution of the antenna illustrated in FIG. 1 at a frequency of 1.78 [GHz].
Figure 14:
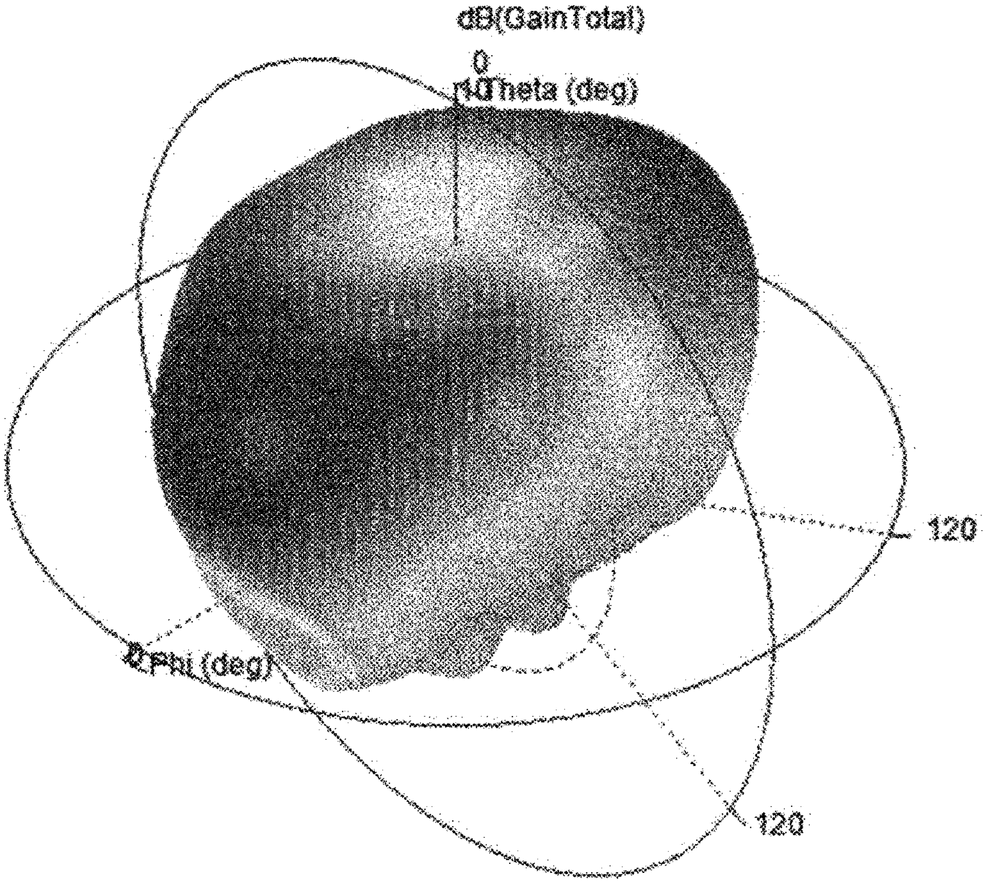
FIG. 14 is a diagram illustrating the radiation pattern of the antenna illustrated in FIG. 1 at the frequency of 1.78 [GHz].

FIG. 13 illustrates the electric field distribution of the antenna 10 at a frequency of 1.78 [GHz]. FIG. 14 illustrates the radiation pattern of the antenna 10 at the frequency of 1.78 [GHz]. As illustrated in FIG. 13, at the frequency of 1.78 [GHz], the orientation of the electric field on the first conductive element 41-1 and the orientation of the electric field on the second conductive element 41-2 may be the same in the Z direction. That is, the frequency of 1.78 [GHz] is part of the second frequency band.

Figure 15:
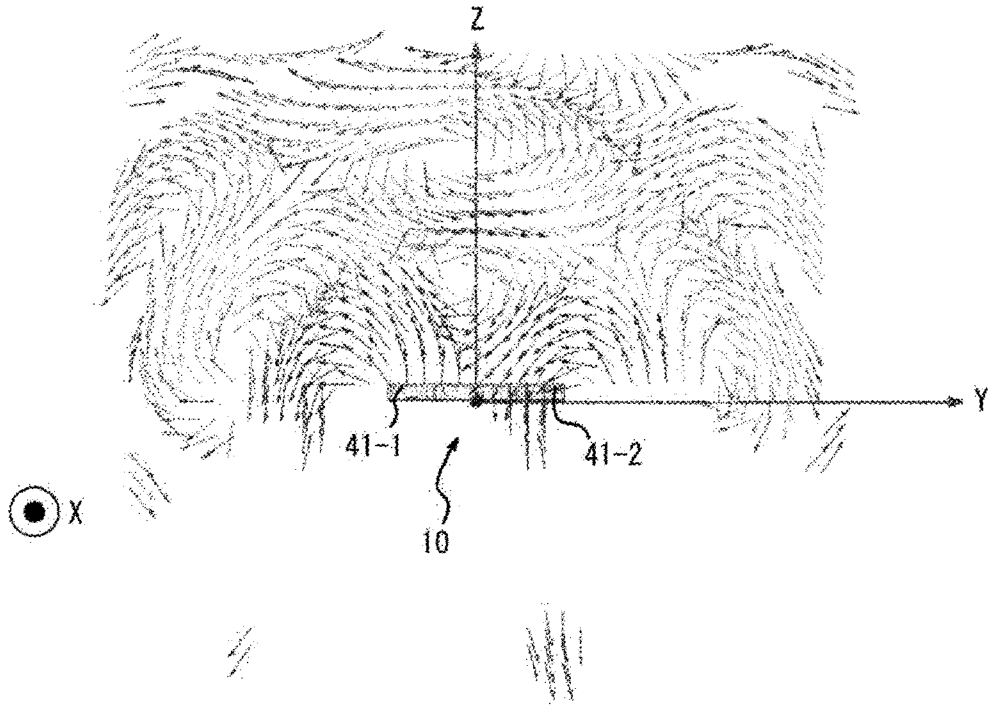
FIG. 15 is a diagram illustrating the electric field distribution of the antenna illustrated in FIG. 1 at a frequency of 2.48 [GHz].
Figure 16:
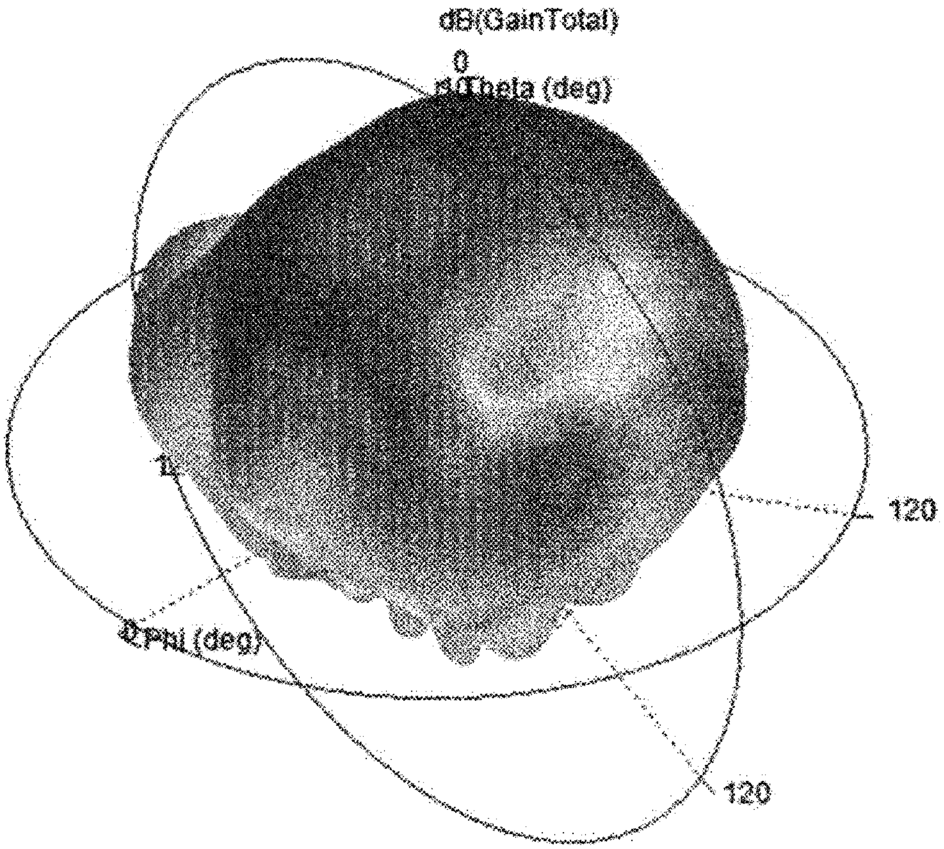
FIG. 16 is a diagram illustrating the radiation pattern of the antenna illustrated in FIG. 1 at the frequency of 2.48 [GHz].

FIG. 15 illustrates the electric field distribution of the antenna 10 at a frequency of 2.48 [GHz]. FIG. 16 illustrates the radiation pattern of the antenna 10 at the frequency of 2.48 [GHz]. As illustrated in FIG. 15, at the frequency of 2.48 [GHz], the orientation of the electric field on the first conductive element 41-1 and the orientation of the electric field on the second conductive element 41-2 may be opposite each other in the Z direction. That is, the frequency of 2.48 [GHz] is part of the third frequency band.

Thus, the antenna 10 can emit electromagnetic waves of the first frequency band, the second frequency band, and the third frequency band. The antenna 10 can emit a broad band of electromagnetic waves. Therefore, the present embodiment can provide a novel antenna 10.

Figure 17:
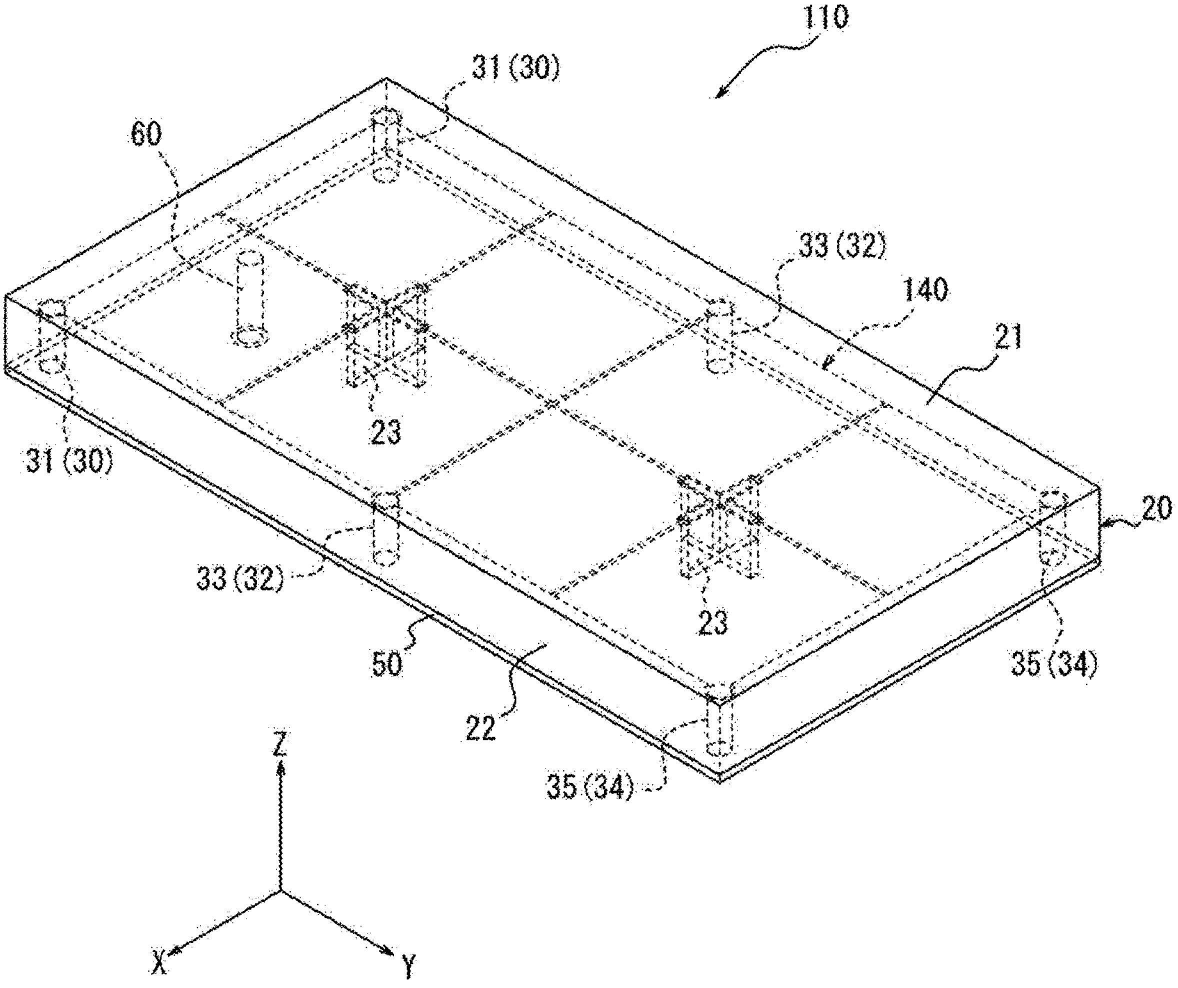
FIG. 17 is a perspective view of an antenna according to another embodiment of the present disclosure.
Figure 18:
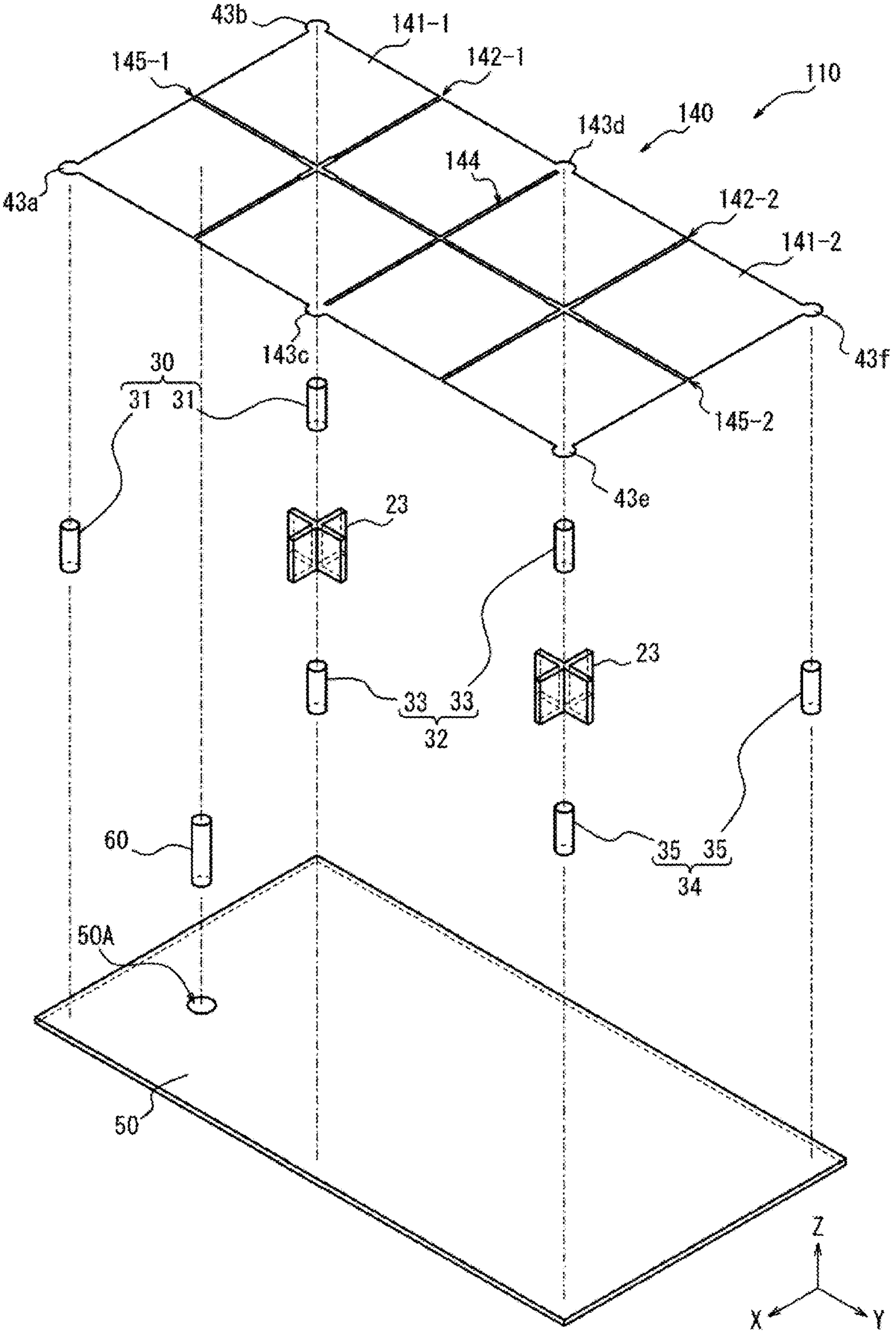
FIG. 18 is an exploded perspective view of a portion of the antenna illustrated in FIG. 17.

FIG. 17 is a perspective view of an antenna 110 according to another embodiment of the present disclosure. FIG. 18 is an exploded perspective view of a portion of the antenna 110 illustrated in FIG. 17.

As illustrated in FIG. 17 and FIG. 18, the antenna 110 includes the base 20, the first connection conductor group 30, the second connection conductor group 32, the third connection conductor group 34, a first conductor 140, the second conductor 50, and the feed line 60. The first connection conductor group 30, the second connection conductor group 32, the third connection conductor group 34, the first conductor 140, the second conductor 50, and the feed line 60 may include an identical conductive material or different conductive materials.

The antenna 110 may exhibit the artificial magnetic conductor character with respect to electromagnetic waves at a predetermined frequency that are incident from the outside on a surface including the first conductor 140.

The first conductor 140 functions as a resonator. The first conductor 140 may extend along the XY plane. The first conductor 140 is located on the upper portion 21 of the base 20. As with the first conductor 40 illustrated in FIG. 3, the first conductor 140 may be located on a surface facing the inner side of the base 20, the surface being one of two surfaces that are included in the upper portion 21 and substantially parallel to XY. The first conductor 140 may be a conductor having a flat plate shape. The first conductor 140 may have a substantially rectangular shape. The short side of the first conductor 140 having the substantially rectangular shape is along the X direction. The long side of the first conductor 140 having the substantially rectangular shape is along the Y direction.

As illustrated in FIG. 18, the first conductor 140 includes a first conductive element 141-1, a second conductive element 141-2, and a gap 144. The first conductor 140 includes the connecting portions **43*a*, 43*b*, 43*e*, 43*f* and connecting portions 143*c*, 143*d*. The first conductor 140 may or may not include the connecting portions 43*a*, 43*b*, 43*e*, 43*f* or the connecting portions 143*c*, 143*d*. Hereinafter, in a case where the first conductive element 141-1 and the second conductive element 141-2 are not particularly distinguished from each other, these are collectively referred to as the "conductive element 141". The conductive element 141, the connecting portions 43*a*, 43*b*, 43*e*, 43*f* and the connecting portions 143*c*, 143*d*** may include an identical conductive material or different conductive materials.

The conductive element 141 functions as a resonator. The conductive element 141 may have a substantially rectangular shape. The conductive element 141 includes four corner portions. The conductive element 141 includes two sides along the X direction and two sides along the Y direction.

The first conductive element 141-1 and the second conductive element 141-2 are aligned in the Y direction with the gap 144 interposed therebetween. The first conductive element 141-1 and the second conductive element 141-2 are capacitively connected to each other by being aligned across the gap 144. The gap 144 extends from the connecting portion 143*c* toward the connecting portion 143*d*. The width of the gap 144 may be adjusted as appropriate in accordance with the desired operating frequency of the antenna 110.

The first conductive element 141-1 includes a gap 142-1 and a gap 145-1. The second conductive element 141-2 includes a gap 142-2 and a gap 145-2. In a configuration where the gap 142-1 and the gap 142-2 are not particularly distinguished from each other, these are collectively referred to as the "gap 142". In a case where the gap 145-1 and the gap 145-2 are not particularly distinguished from each other, these are collectively referred to as the "gap 145".

The gap 142 extends from a central portion of one of two sides of the conductive element 141 along the Y direction toward a central portion of the other side thereof. The gap 142 is along the X direction. The width of a portion at or near the center of the gap 142 along the X direction may be larger than the width of another portion of the gap 142. A portion of a pillar portion 23 on the Z axis positive direction side may be located in a portion at or near the center of the gap 142. The width of the gap 142 may be adjusted as appropriate in accordance with the desired operating frequency of the antenna 110.

The gap 145 extends from a central portion of one of two sides of the conductive element 141 along the X direction toward a central portion of the other side thereof. The gap 145 is along the X direction. The Y axis positive direction side of the gap 145-1 and the Y axis negative direction side of the gap 145-2 may be connected via the gap 144. The width at or near the center of the gap 145 along the Y direction may be larger than the width of another portion of the gap 145. A portion of the pillar portion 23 on the Z axis positive direction side may be located at or near the center of the gap 145 along the Y direction. The width of the gap 145 may be adjusted as appropriate in accordance with the desired operating frequency of the antenna 110.

The connecting portion 143*c* is located at or near the center of one of two long sides of the first conductor 140, the one being on the X axis positive direction side. The connecting portion 143*c* is located in one of two corner portions on the Y axis positive direction side of the first conductive element 141-1, the one being on the X axis positive direction side. The connecting portion 143*c* is located in one of two corner portions on the Y axis negative direction side of the second conductive element 141-2, the one being on the X axis positive direction side. The connecting portion 143*c* is electrically connected to the second connection conductor 33. The connecting portion 143*c* may have a rounded shape in accordance with the second connection conductor 33. In a configuration in which the first conductor 140 does not include the connecting portion 143*c*, one of two corner portions of the first conductive element 141-1 on the Y axis positive direction side, the one being on the X axis positive direction side, may be electrically connected directly to the second connection conductor 33. In a configuration in which the first conductor 140 does not include the connecting portion 143*c*, one of two corner portions of the second conductive element 141-2 on the Y axis negative direction side, the one being on the X axis positive direction side, may be electrically connected directly to the second connection conductor 33.

The connecting portion 143*d* is located at or near the center of one of two long sides of the first conductor 140, the one being on the X axis negative direction side. The connecting portion 143*d* is located in one of two corner portions of the first conductive element 141-1 on the Y axis positive direction side, the one being on the X axis negative direction side. The connecting portion 143*d* is located in one of two corner portions of the second conductive element 141-2 on the Y axis negative direction side, the one being on the X axis negative direction side. The connecting portion 143*d* is electrically connected to the second connection conductor 33. The connecting portion 143*d* may have a rounded shape in accordance with the second connection conductor 33. In a configuration in which the first conductor 140 does not include the connecting portion 143*d*, one of two corner portions of the first conductive element 141-1 on the Y axis positive direction side, the one being on the X axis negative direction side, may be electrically connected directly to the second connection conductor 33. In a configuration in which the first conductor 140 does not include the connecting portion 143*d*, one of two corner portions of the second conductive element 141-2 on the Y axis negative direction side, the one being on the X axis negative direction side, may be electrically connected directly to the second connection conductor 33.

The first conductor 140 capacitively connects the first connection conductor group 30 and the second connection conductor group 32. For example, the first conductive element 141-1 is electrically connected to the first connection conductors 31 by the connecting portions 43*a*, 43*b* and to the second connection conductors 33 by the connecting portions 143*c*, 143*d*. The first connection conductors 31 and the second connection conductors 33 may be capacitively connected via the gap 142-1 and the gap 145-1 of the first conductive element 141-1.

The first conductor 140 capacitively connects the second connection conductor group 32 and the third connection conductor group 34. For example, the second conductive element 141-2 is electrically connected to the second connection conductors 33 by the connecting portions 143*c*, 143*d* and to the third connection conductors 35 by the connecting portions 43*e*, 43*f*. The second connection conductors 33 and the third connection conductors 35 may be capacitively connected via the gap 142-2 and the gap 145-2 of the second conductive element 141-2.

The first conductor 140 capacitively connects the first connection conductor group 30 and the third connection conductor group 34. For example, the first conductive element 141-1 is electrically connected to the first connection conductors 31 by the connecting portions 43*a*, 43*b*. The second conductive element 141-2 is be electrically connected to the third connection conductors 35 by the connecting portions 43*e*, 43*f*. The first connection conductor group 30 and the third connection conductor group 34 may be capacitively connected via the gap 142-1 and the gap 145-1 of the first conductive element 141-1, the gap 144, and the gap 142-2 and the gap 145-2 of the second conductive element 141-2.

In a manner identical or similar to that of the configuration illustrated in FIGS. 4 and 5, the antenna 110 emits electromagnetic waves in the first frequency band. The antenna 110 emits electromagnetic waves in the first frequency band by loop electrical currents flowing along the first loop and the second loop.

In a manner identical or similar to that of the configuration illustrated in FIGS. 6 and 7, the antenna 110 emits electromagnetic waves in the second frequency band. The antenna 110 emits electromagnetic waves in the second frequency band, with the orientation of the electrical current flowing through the first connection conductor group 30, the orientation of the electrical current flowing through the second connection conductor group 32, and the orientation of the electrical current flowing through the third connection conductor group 34 being the same. The antenna 110 serves as a dielectric resonator antenna in the second frequency band. In the second frequency band, the first dielectric resonator and the second dielectric resonator may resonate in the TM mode of dielectric resonators in the same phase.

In a manner identical or similar to that of the configuration illustrated in FIGS. 8 and 9, the antenna 110 emits electromagnetic waves in the third frequency band. The antenna 110 emits electromagnetic waves in the third frequency band, with the orientation of the electrical current flowing through the first connection conductor group 30 and the orientation of the electrical current flowing through the third connection conductor group 34 being opposite each other. The antenna 110 serves as a dielectric resonator antenna in the third frequency band. In the third frequency band, the first dielectric resonator and the second dielectric resonator may resonate in the TM mode of dielectric resonators in an opposite phase from each other.

Simulation Results

Figure 19:
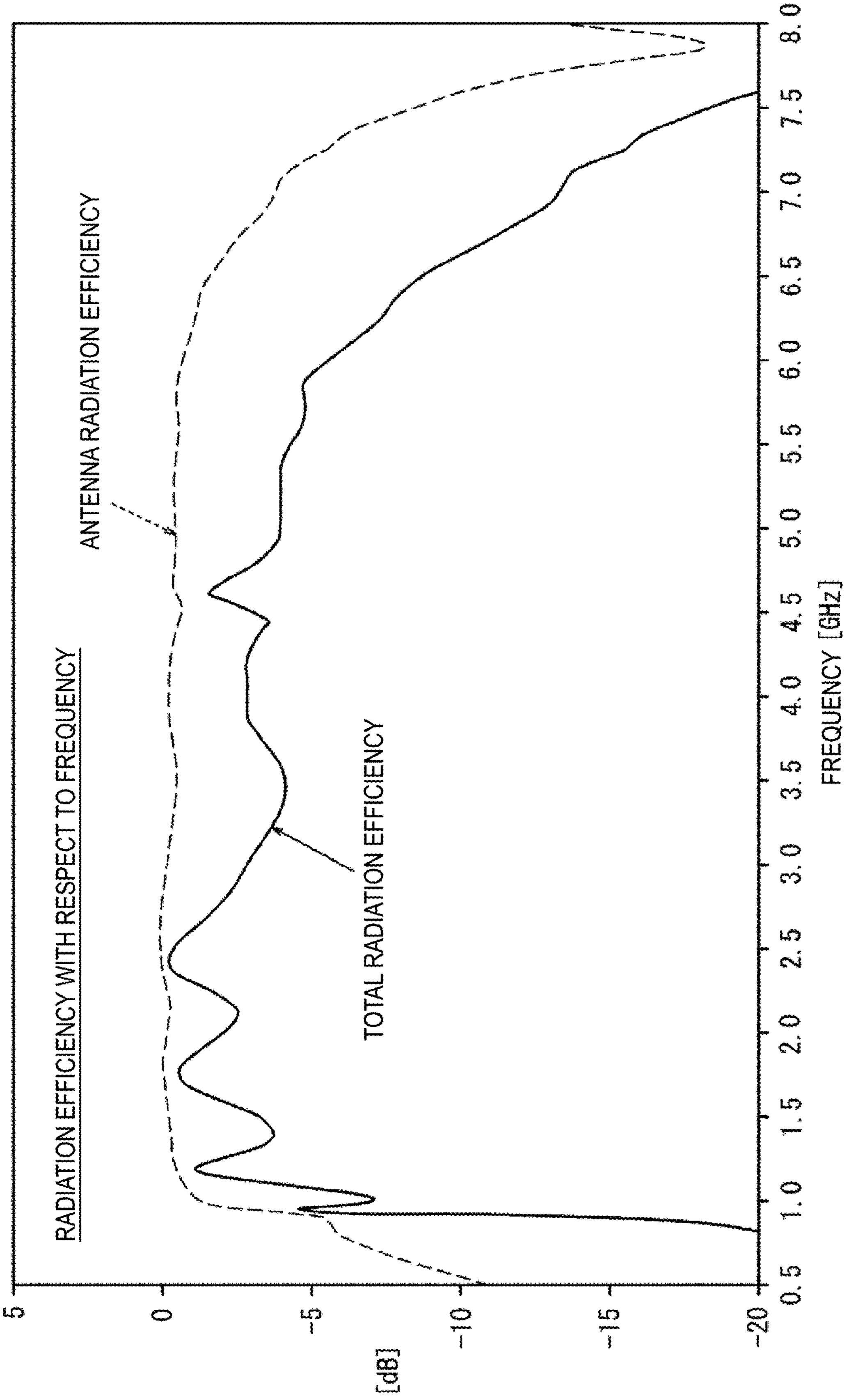
FIG. 19 is a graph showing the radiation efficiency, with respect to frequency, of the antenna illustrated in FIG. 17.

FIG. 19 is a graph showing the radiation efficiency, with respect to frequency, of the antenna 110 illustrated in FIG. 17. The data shown in FIG. 19 was obtained by a simulation. In the simulation, the size of the antenna 110 was the same as that of the antenna 10 of the simulation illustrated in FIG. 10. In the simulation, the size of the first conductor 140 was the same as that of the first conductor 40 of the simulation illustrated in FIG. 10. The antenna 110 was disposed on a metal conductor such that the second conductor 50 faces the metal conductor, as in the simulation illustrated in FIG. 10. A metal conductor having a size of 300 mm×300 mm was used as the metal conductor.

The solid line indicates total radiation efficiency with respect to frequency. The dotted line indicates antenna radiation efficiency. This simulation, as with the simulation illustrated in FIG. 10, evaluated a frequency bandwidth having a total radiation efficiency of greater than −7 [dB]. The total radiation efficiency indicates that the antenna 110 is available in a broad band including frequency bands of from 0.8 [GHz] to 1.0 [GHz], from 1.3 [GHz] to 5.3 GHz, and from 5.5 [GHz] to 6.0 [GHz].

Figure 20:
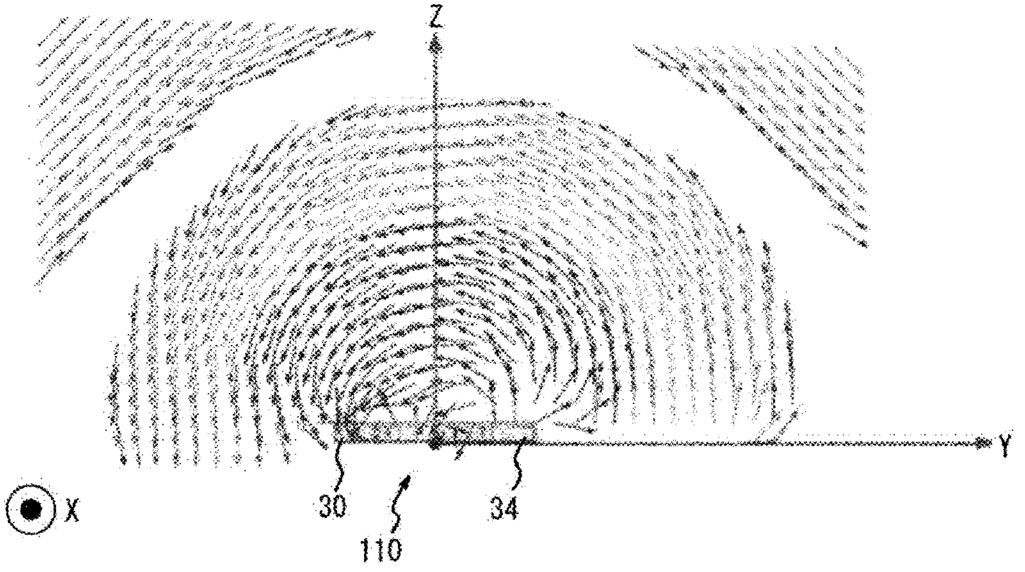
FIG. 20 is a diagram illustrating the electric field distribution of the antenna illustrated in FIG. 17 at a frequency is 0.84 [GHz].
Figure 21:
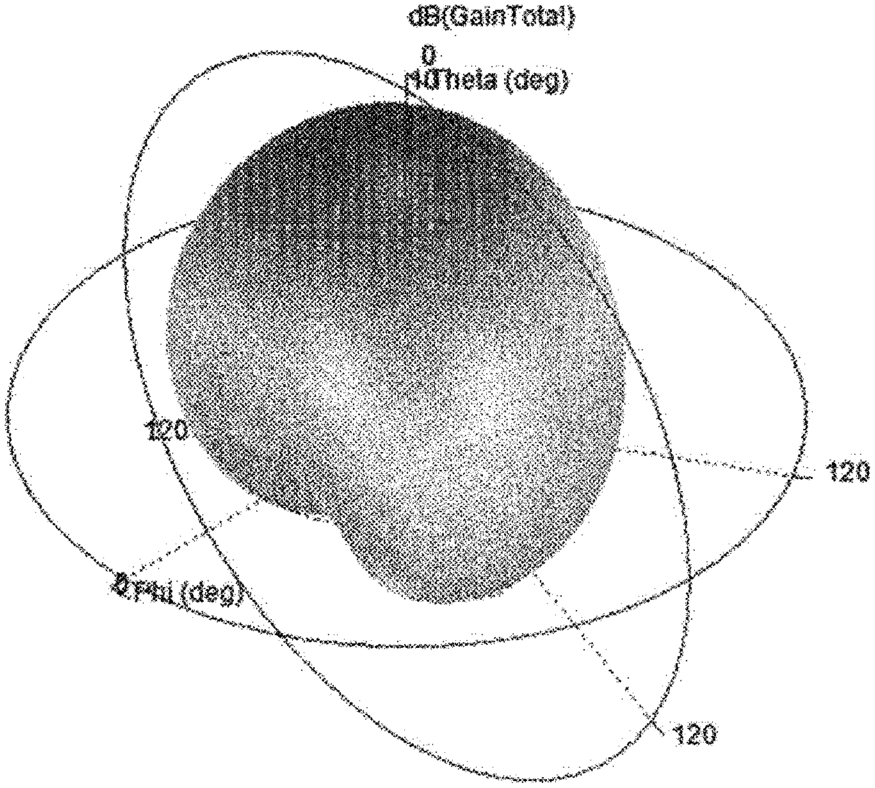
FIG. 21 is a diagram illustrating the radiation pattern of the antenna illustrated in FIG. 17 at the frequency of 0.84 [GHz].

FIG. 20 illustrates the electric field distribution of the antenna 110 at a frequency of 0.84 [GHz]. FIG. 21 illustrates the radiation pattern of the antenna 110 at the frequency of 0.84 [GHz]. As illustrated in FIG. 20, at the frequency is 0.84 [GHz], the electric field is directed from the third connection conductor group 34 toward the first connection conductor group 30 on the Z axis positive direction side. That is, the frequency of 0.84 [GHz] is part of the first frequency band.

Figure 22:
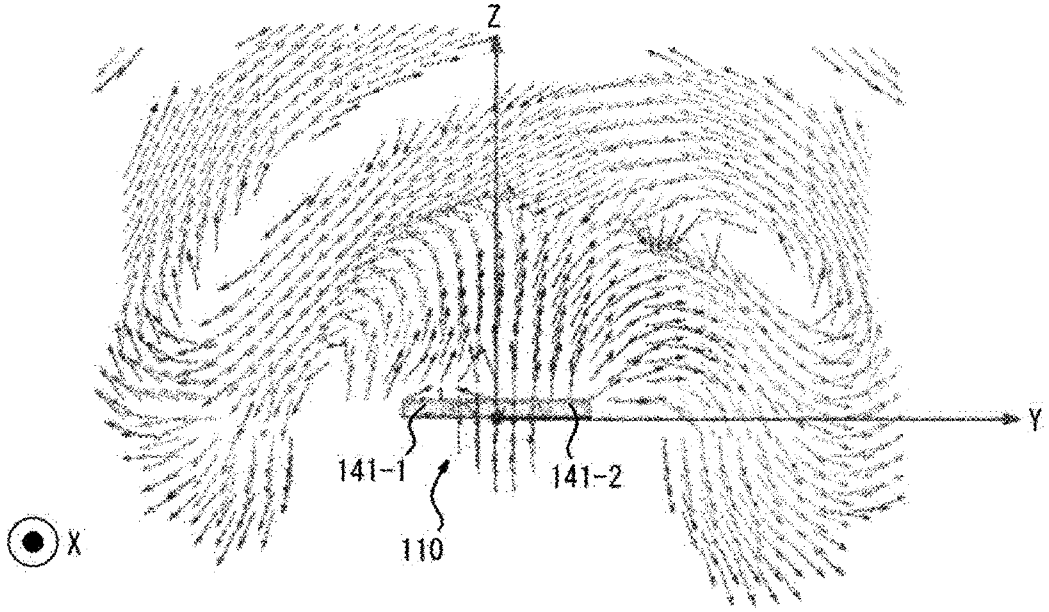
FIG. 22 is a diagram illustrating the electric field distribution of the antenna illustrated in FIG. 17 at a frequency of 1.72 [GHz].
Figure 23:
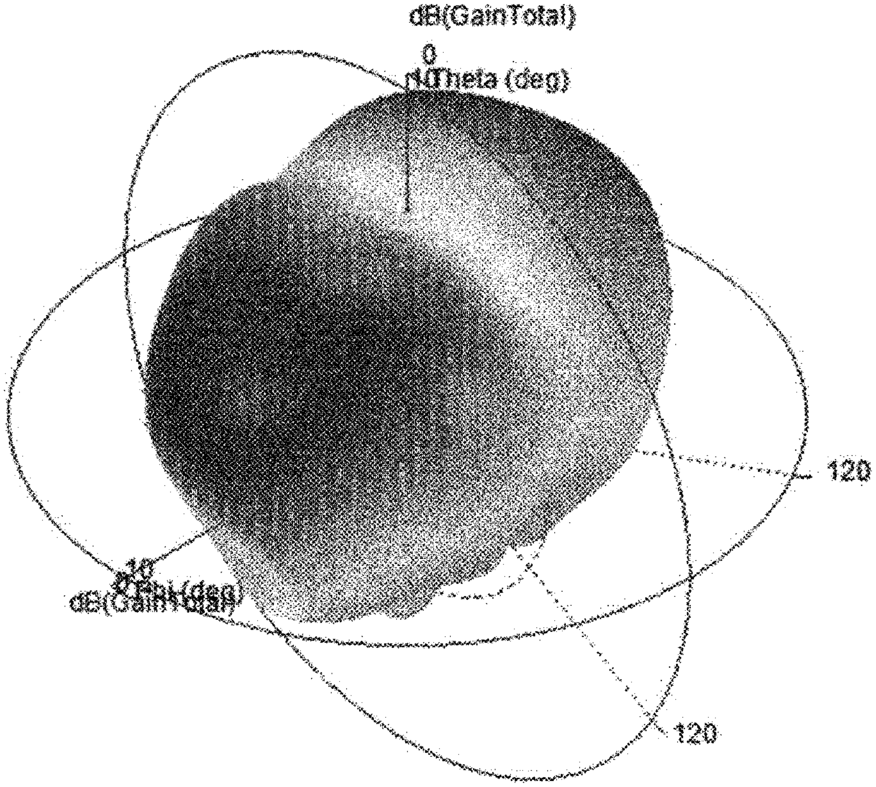
FIG. 23 is a diagram illustrating the radiation pattern of the antenna illustrated in FIG. 17 at the frequency 1.72 [GHz].

FIG. 22 illustrates the electric field distribution of the antenna 110 at a frequency of 1.72 [GHz]. FIG. 23 illustrates the radiation pattern of the antenna 110 at the frequency 1.72 [GHz]. As illustrated in FIG. 22, at the frequency of 1.72 [GHz], the orientation of the electric field on the first conductive element 141-1 and the orientation of the electric field on the second conductive element 141-2 may be the same in the Z direction. That is, the frequency of 1.72 [GHz] is part of the second frequency band.

Figure 24:
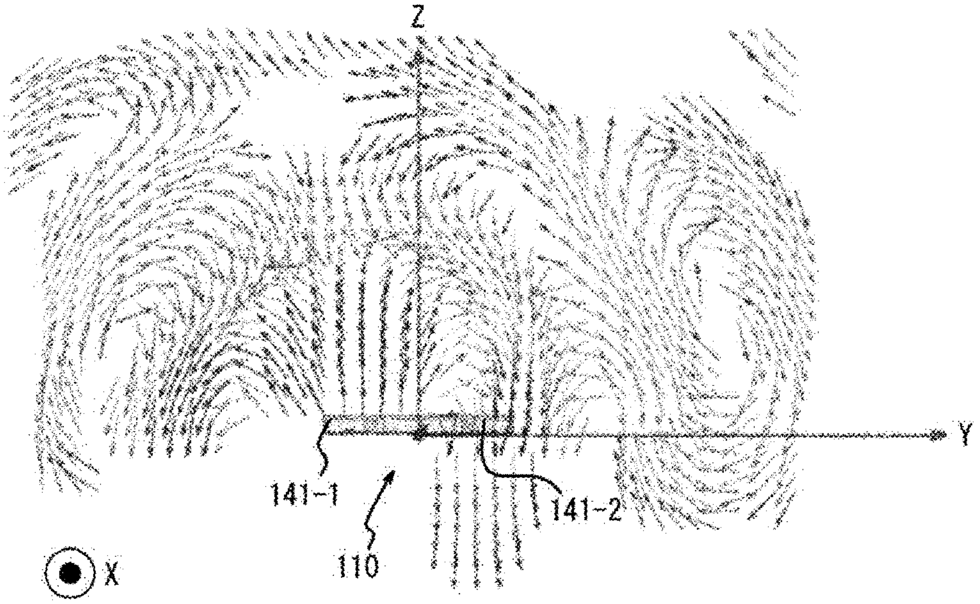
FIG. 24 is a diagram illustrating the electric field distribution of the antenna illustrated in FIG. 17 at a frequency of 2.08 [GHz].
Figure 25:
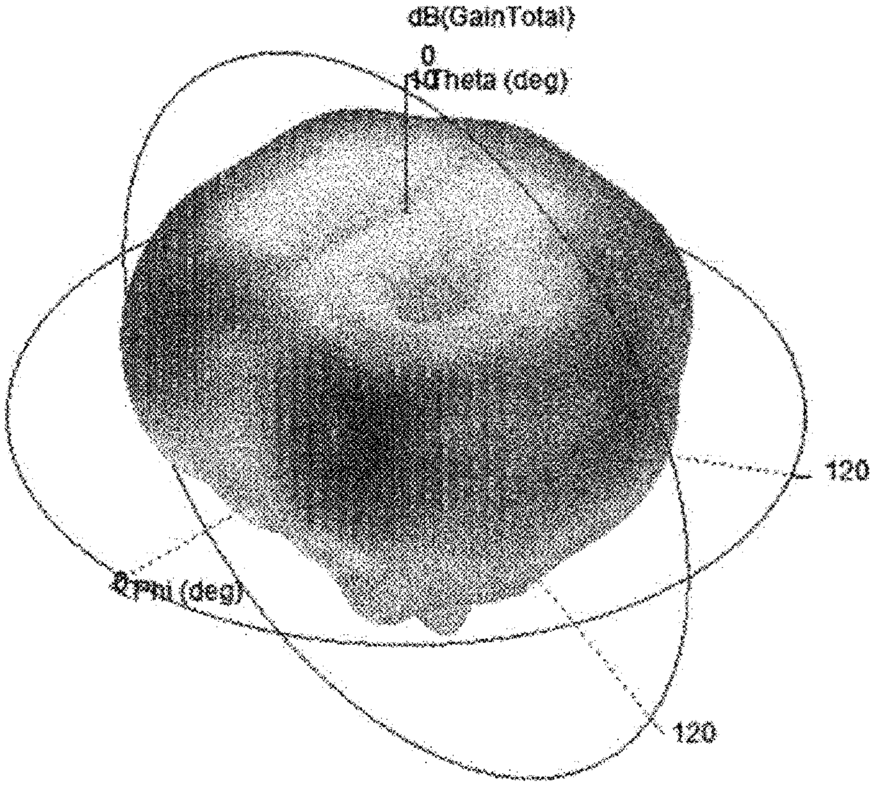
FIG. 25 is a diagram illustrating the radiation pattern of the antenna illustrated in FIG. 17 at the frequency of 2.08 [GHz].

FIG. 24 illustrates the electric field distribution of the antenna 110 at a frequency of 2.08 [GHz]. FIG. 25 illustrates the radiation pattern of the antenna 110 at the frequency of 2.08 [GHz]. As illustrated in FIG. 24, at the frequency of 2.08 [GHz], the orientation of the electric field on the first conductive element 141-1 and the orientation of the electric field on the second conductive element 141-2 may be opposite each other in the Z direction. That is, the frequency of 2.08 [GHz] is part of the third frequency band.

Thus, the antenna 110 can emit electromagnetic waves in the first frequency band, the second frequency band, and the third frequency band. The antenna 110 can emit a broad band of electromagnetic waves. Therefore, the other embodiment can provide a novel antenna 110.

Other effects and configurations of the antenna 110 are identical or similar to those of the antenna 10 illustrated in FIG. 1.

Figure 26:
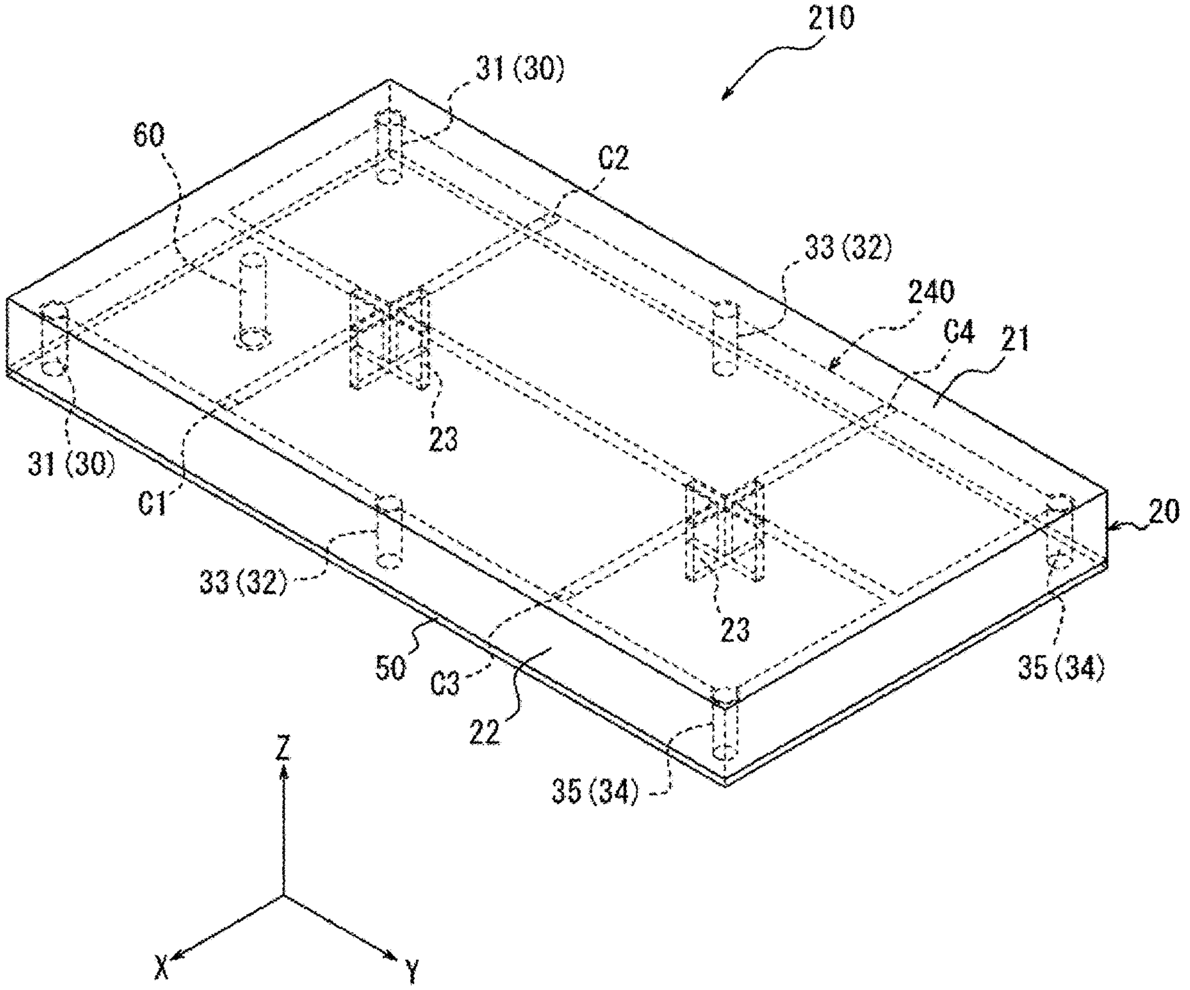
FIG. 26 is a perspective view of an antenna according to yet another embodiment of the present disclosure.
Figure 27:
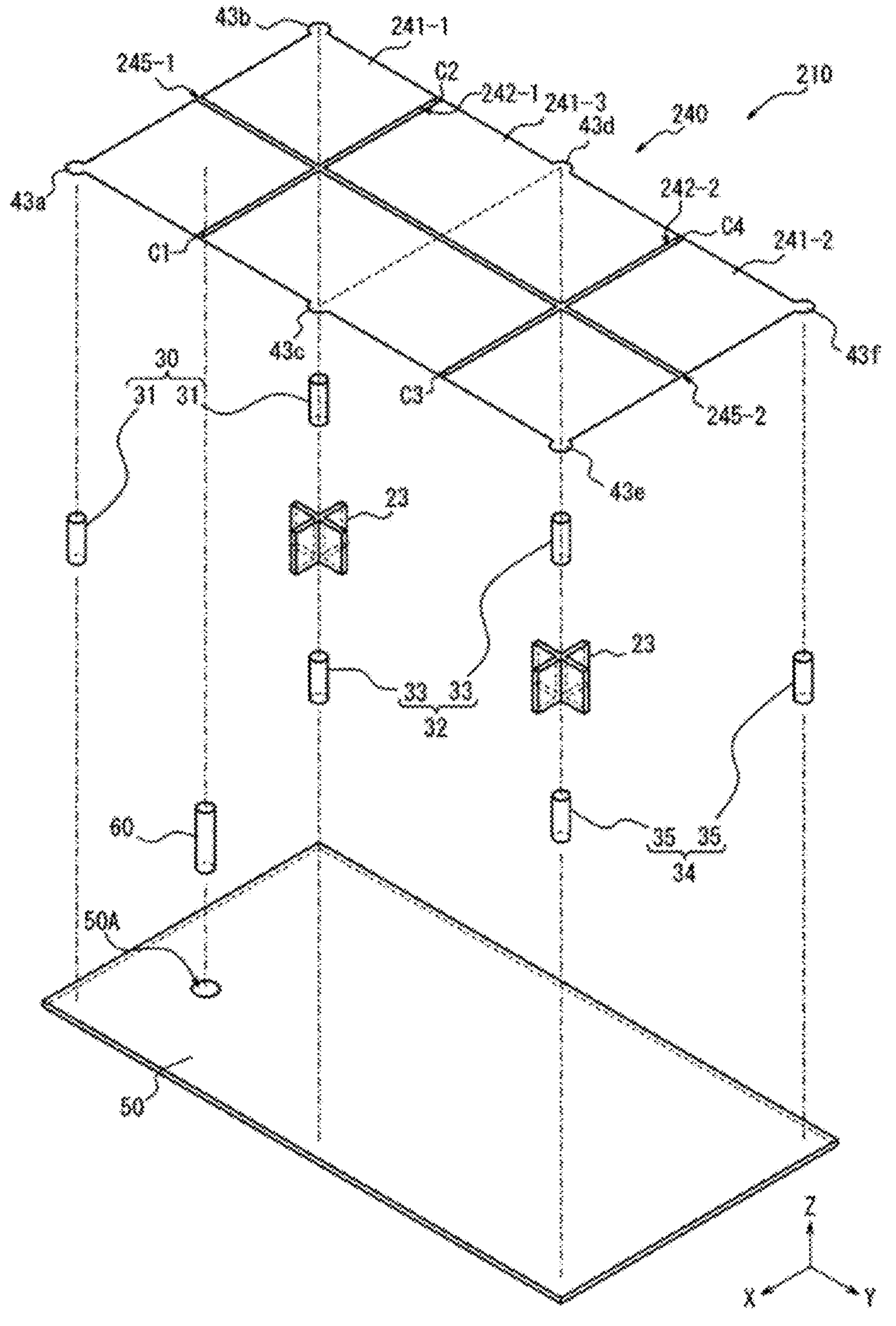
FIG. 27 is an exploded perspective view of a portion of the antenna illustrated in FIG. 26.

FIG. 26 is a perspective view of an antenna 210 according to yet another embodiment of the present disclosure. FIG. 27 is an exploded perspective view of a portion of the antenna 210 illustrated in FIG. 26.

As illustrated in FIG. 26 and FIG. 27, the antenna 210 includes the base 20, the first connection conductor group 30, the second connection conductor group 32, the third connection conductor group 34, a first conductor 240, the second conductor 50, and the feed line 60. The first connection conductor group 30, the second connection conductor group 32, the third connection conductor group 34, the first conductor 240, the second conductor 50, and the feed line 60 may include an identical conductive material or different conductive materials.

The antenna 210 may exhibit the artificial magnetic conductor character with respect to electromagnetic waves at a predetermined frequency that are incident from the outside on a surface including the first conductor 240.

The first conductor 240 includes a first conductive element 241-1, a second conductive element 241-2, capacitative elements C1, C2, C3, C4 and the connecting portions 43*a*, 43*b*, 43*c*, 43*d*, 43*e*, 43*f*. However, the first conductor 240 may or may not include the connecting portions 43*a*, 43*b*, 43*c*, 43*d*, 43*e*, 43*f*. Hereinafter, in a case where the first conductive element 241-1 and the second conductive element 241-2 are not particularly distinguished from each other, these are collectively referred to as the "conductive element 241". The conductive element 241 and the connecting portions 43*a* to 43*f* may include an identical conductive material or different conductive materials.

The conductive element 241 functions as a resonator. The conductive element 241 may have a substantially rectangular shape. The conductive element 241 includes four corner portions. The conductive element 241 includes two sides along the X direction and two sides along the Y direction. The first conductive element 241-1 includes a gap 242-1 and a gap 245-1. The second conductive element 241-2 includes a gap 242-2 and a gap 245-2. Hereinafter, in a case where the gap 242-1 and the gap 242-2 are not particularly distinguished from each other, these are collectively referred to as the "gap 242". In a case where the gap 245-1 and the gap 245-2 are not particularly distinguished from each other, these are collectively referred to as the "gap 245".

The first conductive element 241-1 and the second conductive element 241-2 are aligned in the Y direction. One side along the X direction on the Y axis positive direction side of the first conductive element 241-1 and one side along the X direction on the Y axis negative direction side of the second conductive element 241-2 are integrated with each other to define a third conductive element 241-3. Two of four corner portions of the first conductive element 241-1, the two being on the Y axis positive direction side, are integrated with two of four corner portions of the second conductive element 241-2, the two being on the Y axis negative direction side.

The gap 242 extends from a central portion of one of two sides of the conductive element 241 along the Y direction toward a central portion of the other side thereof. The gap 242 is along the X direction. A portion at or near the center of the gap 242 along the X direction may include a portion of the pillar portion 23 on the Z axis positive direction side. The width of the gap 242 may be adjusted as appropriate in accordance with the desired operating frequency of the antenna 10.

The gap 245 extends from a central portion of one of two sides of the conductive element 241 along the X direction toward a central portion of the other side thereof. The gap 245 is along the Y direction. A portion of the center portion of the gap 245 along the Y direction may include a portion of the pillar portion 23 on the Z axis positive direction side. An end portion on the Y axis positive direction side of the gap 245-1 and an end portion on the Y axis negative direction side of the gap 245-2 may be connected.

The capacitative elements C1 to C4 may be each a chip capacitor or the like. The capacitative element C1 is located at an end portion on the X axis positive direction side of the gap 242-1. The capacitative element C2 is located at an end portion on the X axis negative direction side of the gap 242-1. The capacitative element C3 is located at an end portion on the X axis positive direction side of the gap 242-2. The capacitative element C4 is located at an end portion on the X axis negative direction side of the gap 242-2. However, the capacitative elements C1 to C4 may be located at any location in the gaps 242-1, 242-2, 245-1, 245-2, respectively, in accordance with the desired operating frequency of the antenna 10. The capacitance values of the capacitative elements C1 to C4 may be adjusted as appropriate in accordance with the desired operating frequency of the antenna 10.

The first conductor 240 capacitively connects the first connection conductor group 30 and the second connection conductor group 32. For example, the first conductive element 241-1 is electrically connected to the first connection conductors 31 by the connecting portions 43*a*, 43*b* and to the second connection conductors 33 by the connecting portions 43*c*, 43*d*. The first connection conductors 31 and the second connection conductors 33 may be capacitively connected via the gap 242-1 and the gap 245-1 of the first conductive element 241-1, and the capacitative element C1 and the capacitative element C2.

The first conductor 240 capacitively connects the second connection conductor group 32 and the third connection conductor group 34. For example, the second conductive element 241-2 is electrically connected to the second connection conductors 33 by the connecting portions 43*c*, 43*d* and to the third connection conductors 35 by the connecting portions 43*e*, 43*f*. The second connection conductors 33 and the third connection conductors 35 may be capacitively connected via the gap 242-2 and the gap 245-2 of the second conductive element 241-2, and the capacitative element C3 and the capacitative element C4.

The first conductor 240 capacitively connects the first connection conductor group 30 and the third connection conductor group 34. For example, the first conductive element 241-1 is electrically connected to the first connection conductors 31 by the connecting portions 43*a*, 43*b*. The second conductive element 241-2 is electrically connected to the third connection conductors 35 by the connecting portions 43*e*, 43*f*. The first connection conductors 31 and the third connection conductors 35 may be capacitively connected via the gap 242-1 and the gap 245-1 of the first conductive element 241-1, the gap 242-2 and the gap 245-2 of the second conductive element 241-2, and the capacitative elements C1 to C4.

In a manner identical or similar to the configuration illustrated in FIGS. 4 and 5, the antenna 210 emits electromagnetic waves in the first frequency band. The antenna 210 emits electromagnetic waves in the first frequency band by the loop electrical currents flowing along the first loop and the second loop.

In a manner identical or similar to the configuration illustrated in FIGS. 6 and 7, the antenna 210 emits electromagnetic waves in the second frequency band. The antenna 210 emits electromagnetic waves in the second frequency band, with the orientation of the electrical current flowing through the first connection conductor group 30, the orientation of the electrical current flowing through the second connection conductor group 32, and the orientation of the electrical current flowing through the third connection conductor group 34 being the same. The antenna 210 serves as a dielectric resonator antenna in the second frequency band. In the second frequency band, the first dielectric resonator and the second dielectric resonator may resonate in the TM mode of dielectric resonators in the same phase.

In a manner identical or similar to the configuration illustrated in FIGS. 8 and 9, the antenna 210 emits electromagnetic waves in the third frequency band. The antenna 210 emits electromagnetic waves in the third frequency band, with the orientation of the electrical current flowing through the first connection conductor group 30 and the orientation of the electrical current flowing through the third connection conductor group 34 being opposite each other. The antenna 210 serves as a dielectric resonator antenna in the third frequency band. In the third frequency band, the first dielectric resonator and the second dielectric resonator may resonate in the TM mode of dielectric resonators in an opposite phase from each other.

Simulation Results

Figure 28:
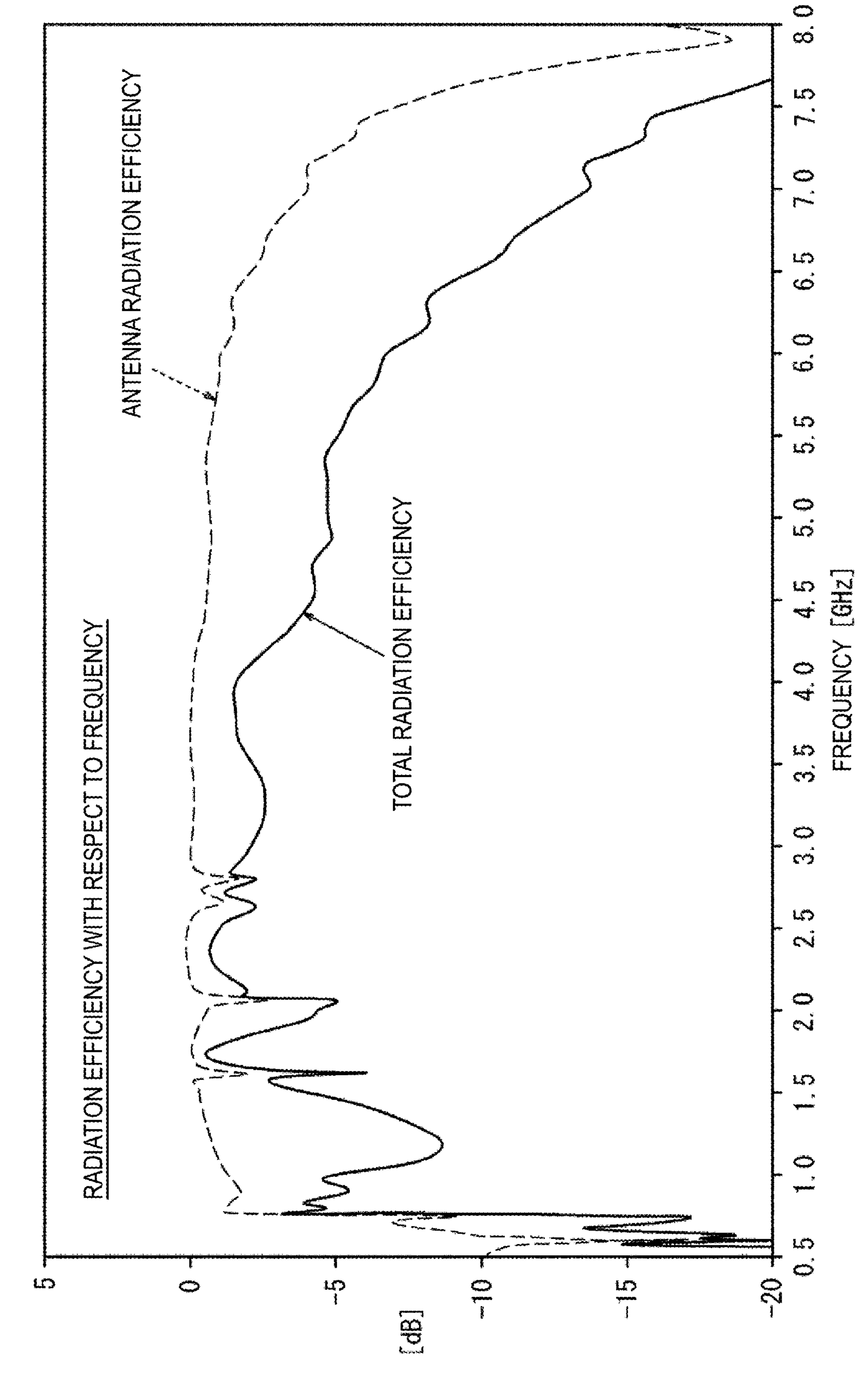
FIG. 28 is a graph showing the radiation efficiency, with respect to frequency, of the antenna illustrated in FIG. 26.

FIG. 28 is a graph showing the radiation efficiency, with regard to frequency, of the antenna 210 illustrated in FIG. 26. The data shown in FIG. 28 was acquired by a simulation. In the simulation, the size of antenna 210 was the same as that of the antenna 10 of the simulation illustrated in FIG. 10. In the simulation, the size of the first conductor 240 was the same as that of the first conductor 40 of the simulation illustrated in FIG. 10. The antenna 210 was disposed on a metal conductor such that the second conductor 50 faces the metal conductor, as in the simulation illustrated in FIG. 10. A metal conductor having a size of 300 mm×300 mm was used as the metal conductor.

In the simulation, the capacitance value of the capacitative element C1 was 1.3 [pF (picofarad)], and the capacitance value of the capacitative element C2 was 1.1 [pF]. The capacitance value of the capacitative element C3 was 0.8 [pF], and the capacitance value of the capacitative element C4 was 1.1 [pF].

The solid line indicates total radiation efficiency with respect to frequency. The dotted line indicates antenna radiation efficiency. This simulation, as with the simulation illustrated in FIG. 10, evaluated a frequency bandwidth having a total radiation efficiency of greater than −7 [dB]. The total radiation efficiency shows that the antenna 210 is available in a broad band including frequency bands of from 0.8 [GHz] to 1.1 [GHz] and from 1.4 [GHz] to 6.0 [GHz].

Figure 29:
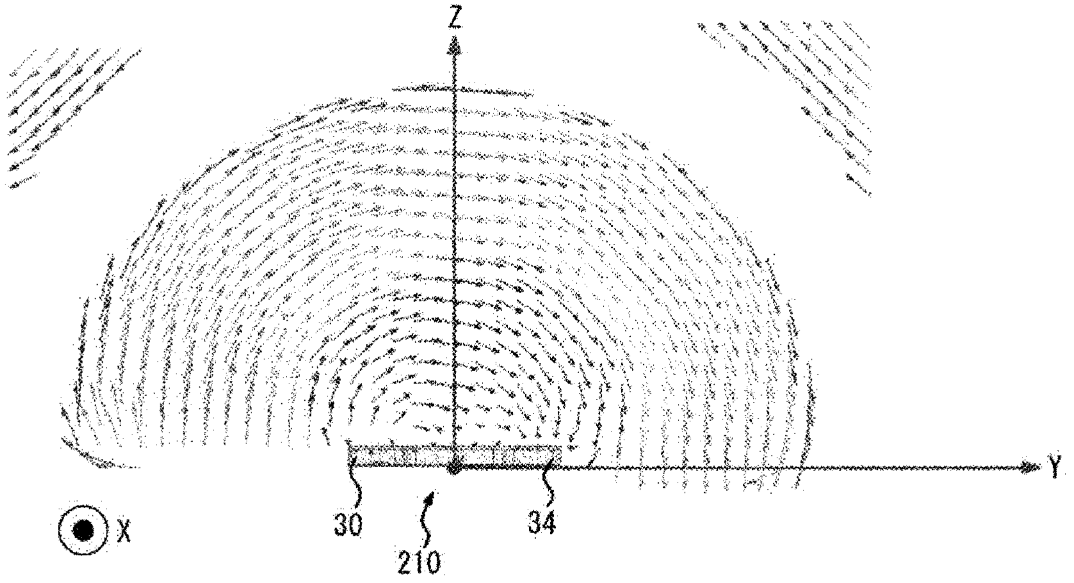
FIG. 29 is a diagram illustrating the electric field distribution of the antenna illustrated in FIG. 26 at a frequency 0.88 [GHz].
Figure 30:
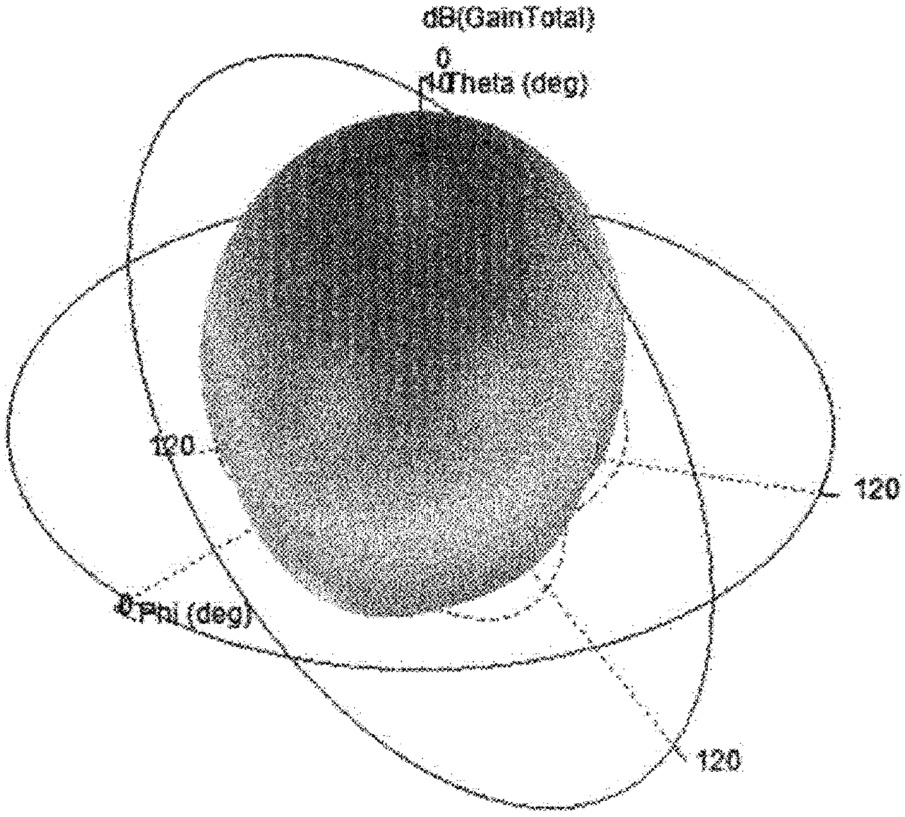
FIG. 30 is a diagram illustrating the radiation pattern of the antenna illustrated in FIG. 26 at the frequency 0.88 [GHz].

FIG. 29 illustrates the electric field distribution of the antenna 210 at a frequency of 0.88 [GHz]. FIG. 30 illustrates the radiation pattern of the antenna 210 at the frequency of 0.88 [GHz]. As illustrated in FIG. 29, at the frequency of 0.88 [GHz], the electric field is directed, on the Z axis positive direction side, from the third connection conductor group 34 toward the first connection conductor group 30. That is, the frequency 0.88 [GHz] is part of the first frequency band.

Figure 31:
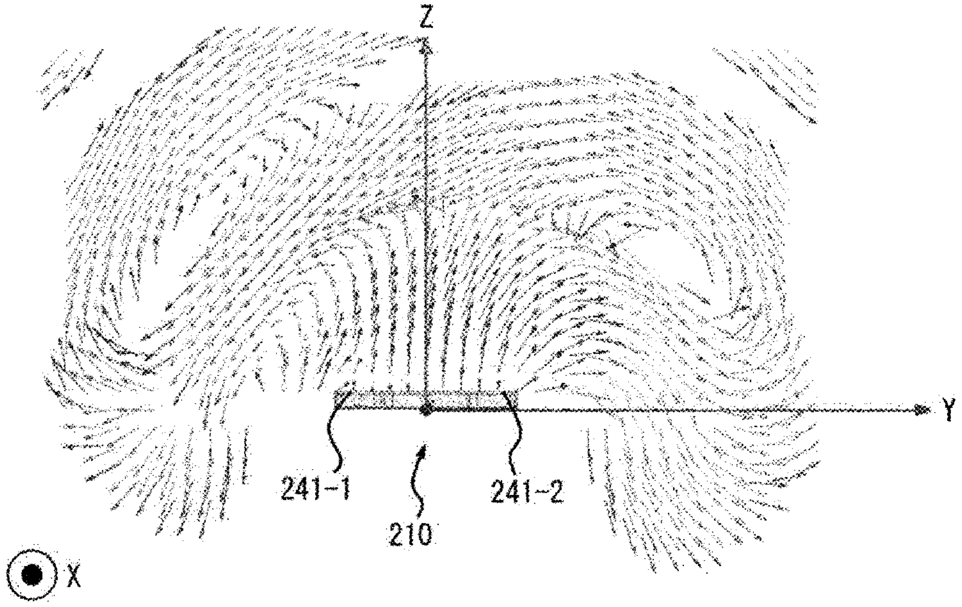
FIG. 31 is a diagram illustrating the electric field distribution of the antenna illustrated in FIG. 26 at a frequency of 1.76 [GHz].
Figure 32:
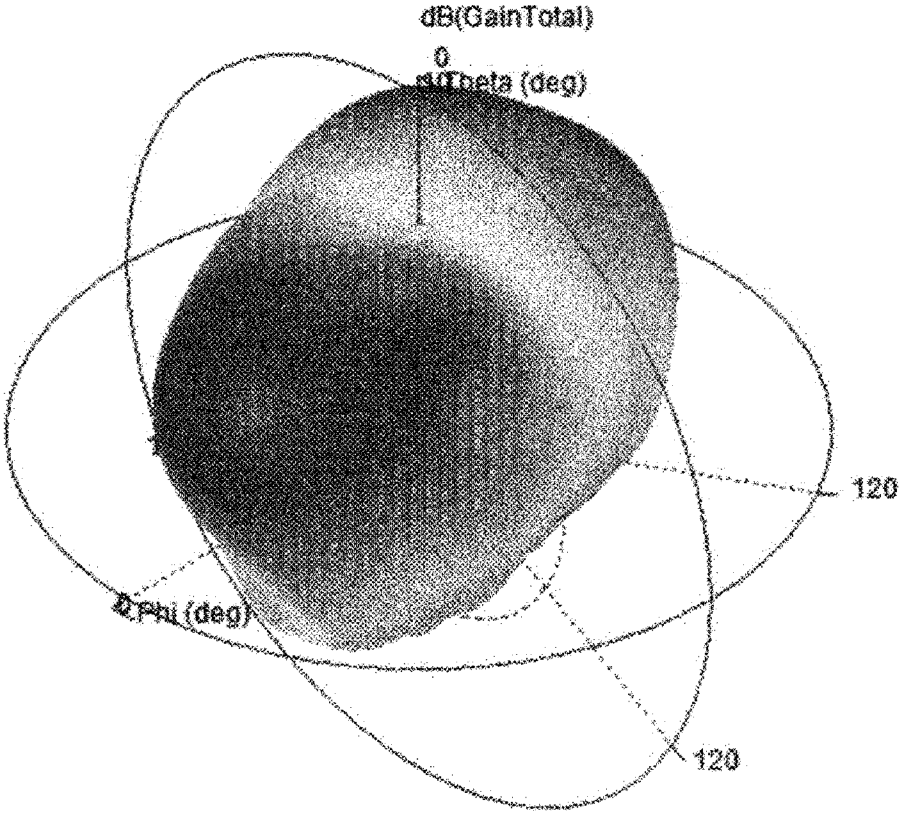
FIG. 32 is a diagram illustrating the radiation pattern of the antenna illustrated in FIG. 26 at the frequency of 1.76 [GHz].

FIG. 31 illustrates the electric field distribution of the antenna 210 at a frequency of 1.76 [GHz]. FIG. 32 illustrates the radiation pattern of the antenna 210 at the frequency of 1.76 [GHz]. As illustrated in FIG. 31, at the frequency of 1.76 [GHz], the orientation of the electric field on the first conductive element 241-1 and the orientation of the electric field on the second conductive element 241-2 may be the same in the Z direction. That is, the frequency of 1.76 [GHz] is part of the second frequency band.

Figure 33:
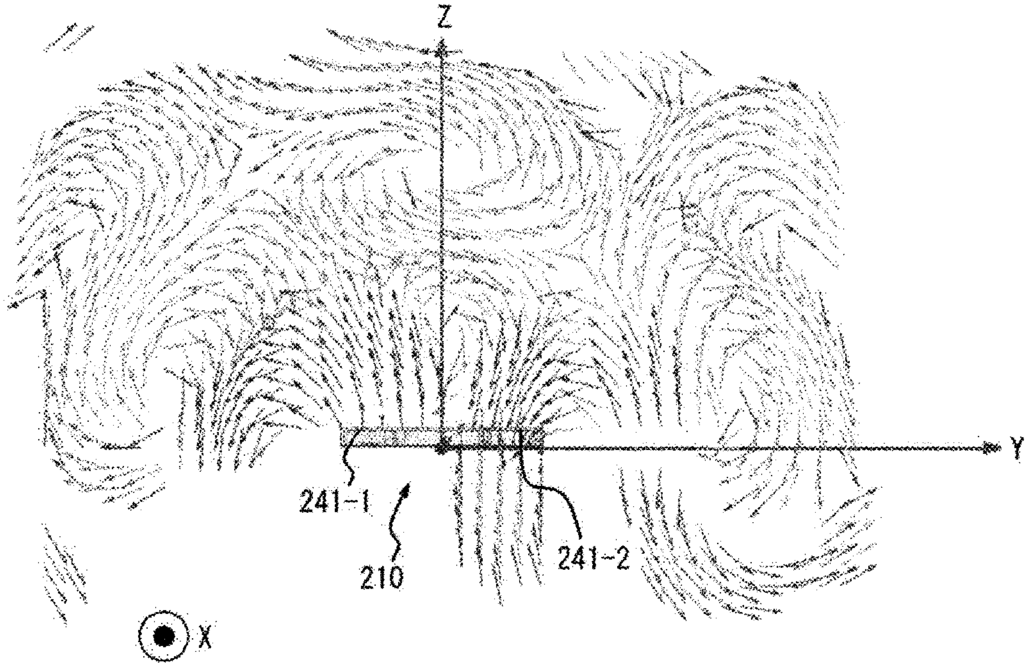
FIG. 33 is a diagram illustrating the electric field distribution of the antenna illustrated in FIG. 26 at a frequency of 2.38 [GHz].
Figure 34:
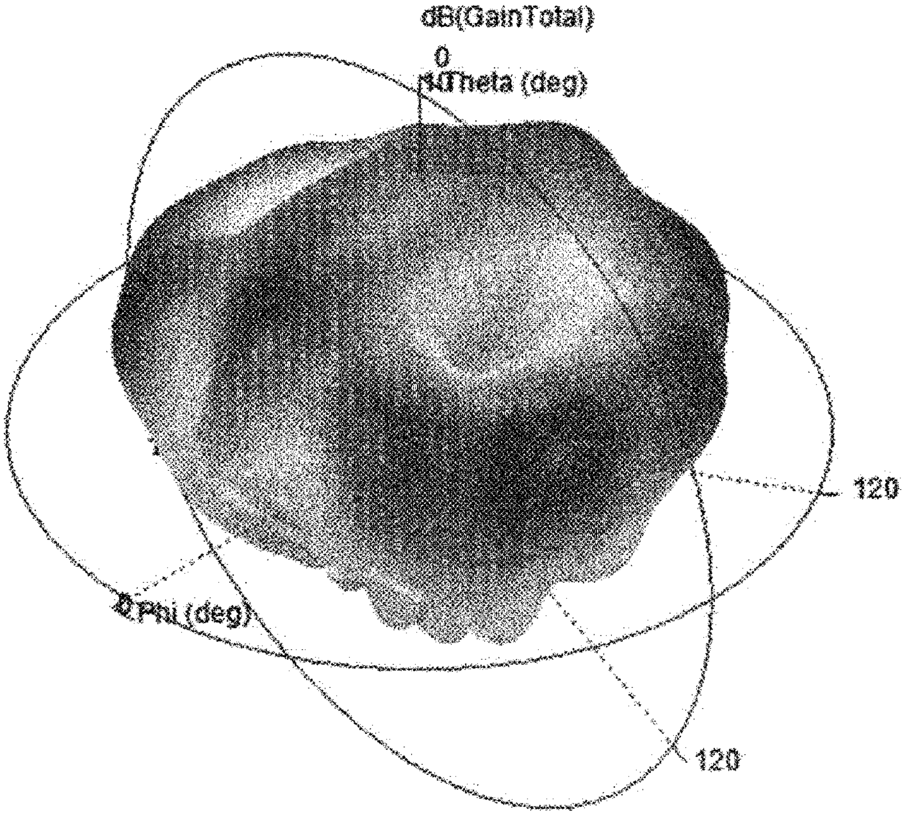
FIG. 34 is a diagram illustrating the radiation pattern of the antenna illustrated in FIG. 26 at the frequency of 2.38 [GHz].

FIG. 33 illustrates the field distribution of the antenna 210 at a frequency 2.38 [GHz]. FIG. 34 illustrates the radiation pattern of the antenna 210 at the frequency of 2.38 [GHz]. As illustrated in FIG. 33, at the frequency of 2.38 [GHz], the orientation of the electric field on the first conductive element 241-1 and the orientation of the electric field on the second conductive element 241-2 can be opposite each other in the Z direction. That is, the frequency of 2.38 [GHz] is part of the third frequency band.

Thus, the antenna 210 can emit electromagnetic waves in the first frequency band, the second frequency band, and the third frequency band. The antenna 210 can emit a broad band of electromagnetic waves. Thus, the present embodiment can provide a novel antenna 210.

Other effects and configurations of the antenna 210 are identical or similar to those of the antenna 10 illustrated in FIG. 1.

Figure 35:
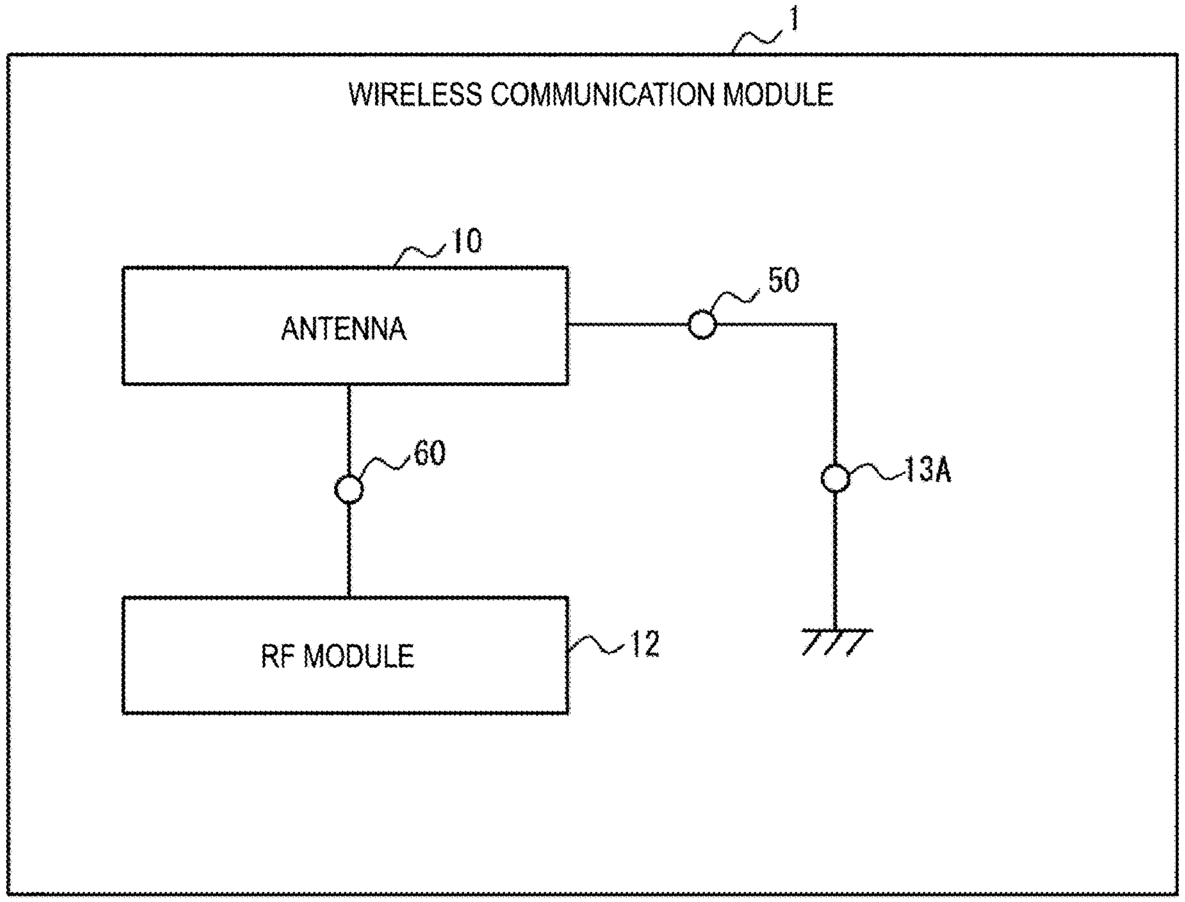
FIG. 35 is a block diagram of a wireless communication module according to an embodiment of the present disclosure.
Figure 36:
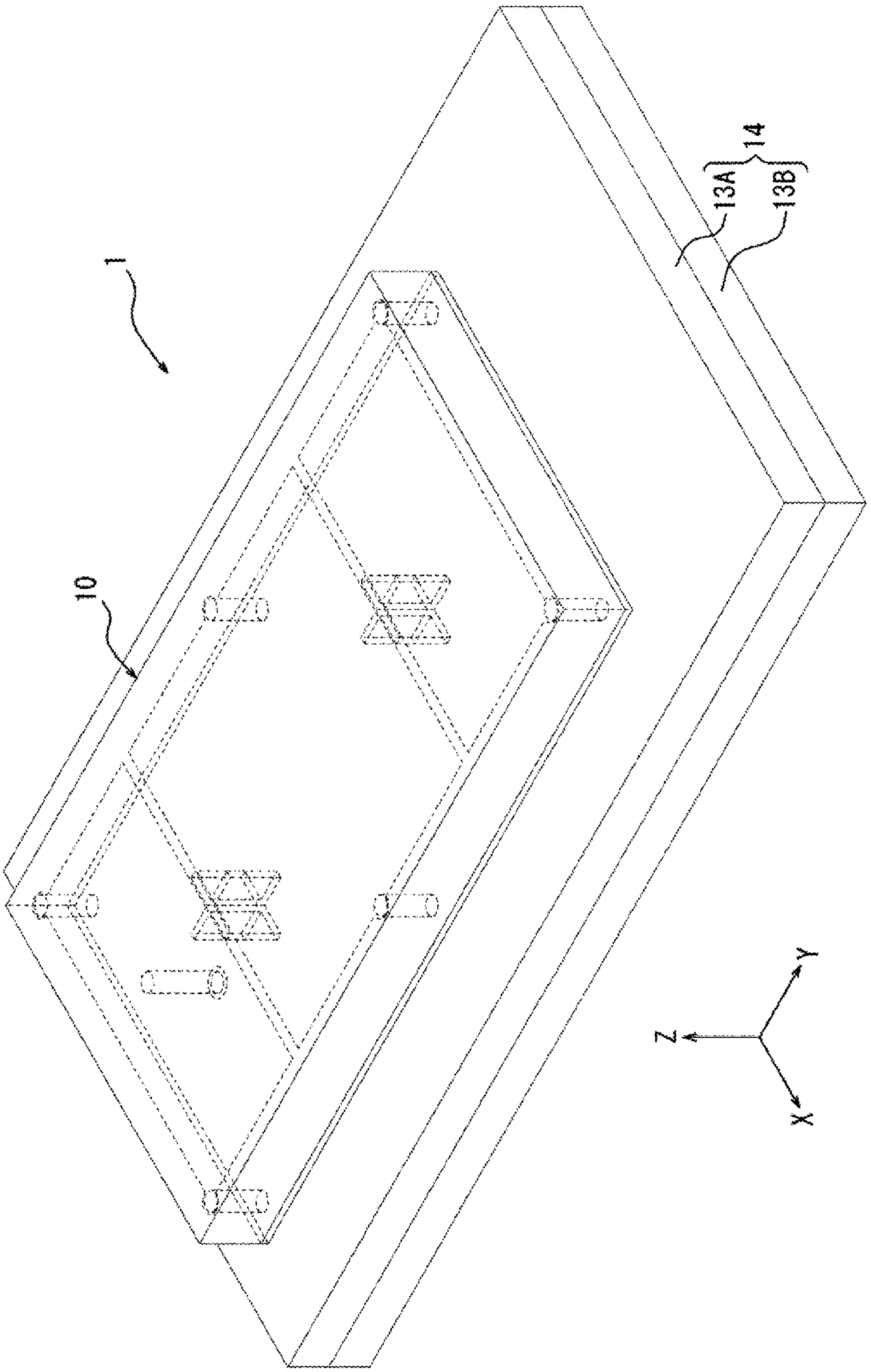
FIG. 36 is a schematic configuration view of the wireless communication module illustrated in FIG. 35.

FIG. 35 is a block diagram of a wireless communication module 1 according to an embodiment of the present disclosure. FIG. 36 is a schematic configuration view of the wireless communication module 1 illustrated in FIG. 35.

The wireless communication module 1 includes the antenna 10, an RF module 12, and a circuit substrate 14 including a ground conductor 13A and an organic substrate 13B. However, the wireless communication module 1 may include the antenna 110 illustrated in FIG. 17 or the antenna 210 illustrated in FIG. 26 instead of the antenna 10.

As illustrated in FIG. 36, the antenna 10 is located above the circuit substrate 14. The feed line 60 of the antenna 10 is connected to the RF module 12 illustrated in FIG. 35 via the circuit substrate 14. The second conductor 50 of the antenna 10 is electromagnetically connected to the ground conductor 13A included in the circuit substrate 14.

The ground conductor 13A may include a conductive material. The ground conductor 13A may extend on the XY plane. On the XY plane, the area of the ground conductor 13A is greater than that of the second conductor 50 of the antenna 10. The length of the ground conductor 13A along the Y direction is greater than that of the second conductor 50 of the antenna 10 along the Y direction. The length of the ground conductor 13A along the X direction is greater than that of the second conductor 50 of the antenna 10 along the X direction. The antenna 10 may be located on an end side in the Y direction than the center of the ground conductor 13A. The center of the antenna 10 may be different from that of the ground conductor 13A on the XY plane. The location where the feed line 60 is electrically connected to the first conductor 40 illustrated in FIG. 1 may be different from the center of the ground conductor 13A on the XY plane.

In the antenna 10, a loop electrical current may be generated along the first loop and the second loop in the first frequency band. In a configuration in which the antenna 10 is located on an end side in the Y direction than the center of the ground conductor 13A, the electrical current channel flowing through the ground conductor 13A is asymmetric. When the electrical current channel flowing through the ground conductor 13A is asymmetric, an antenna structure including the antenna 10 and the ground conductor 13A increases in polarization components of radiation waves in the X direction. By increasing the polarization components of the radiation waves in the X direction, the radiation waves can improve in total radiation efficiency.

The antenna 10 may be integrated with the circuit substrate 14. In a configuration in which the antenna 10 and the circuit substrate 14 are integrated with each other, the second conductor 50 of the antenna 10 may be integrated with the ground conductor 13A of the circuit substrate 14.

The RF module 12 controls electrical power fed to the antenna 10. The RF module 12 modulates a baseband signal and supply the baseband signal thus modulated to the antenna 10. The RF module 12 may modulate an electrical signal received by the antenna 10 into a baseband signal.

In the antenna 10, the change in resonant frequency due to the conductor on the circuit board 14 side is small. The wireless communication module 1 includes the antenna 10 and thus may reduce the effect received from the external environment.

Figure 37:
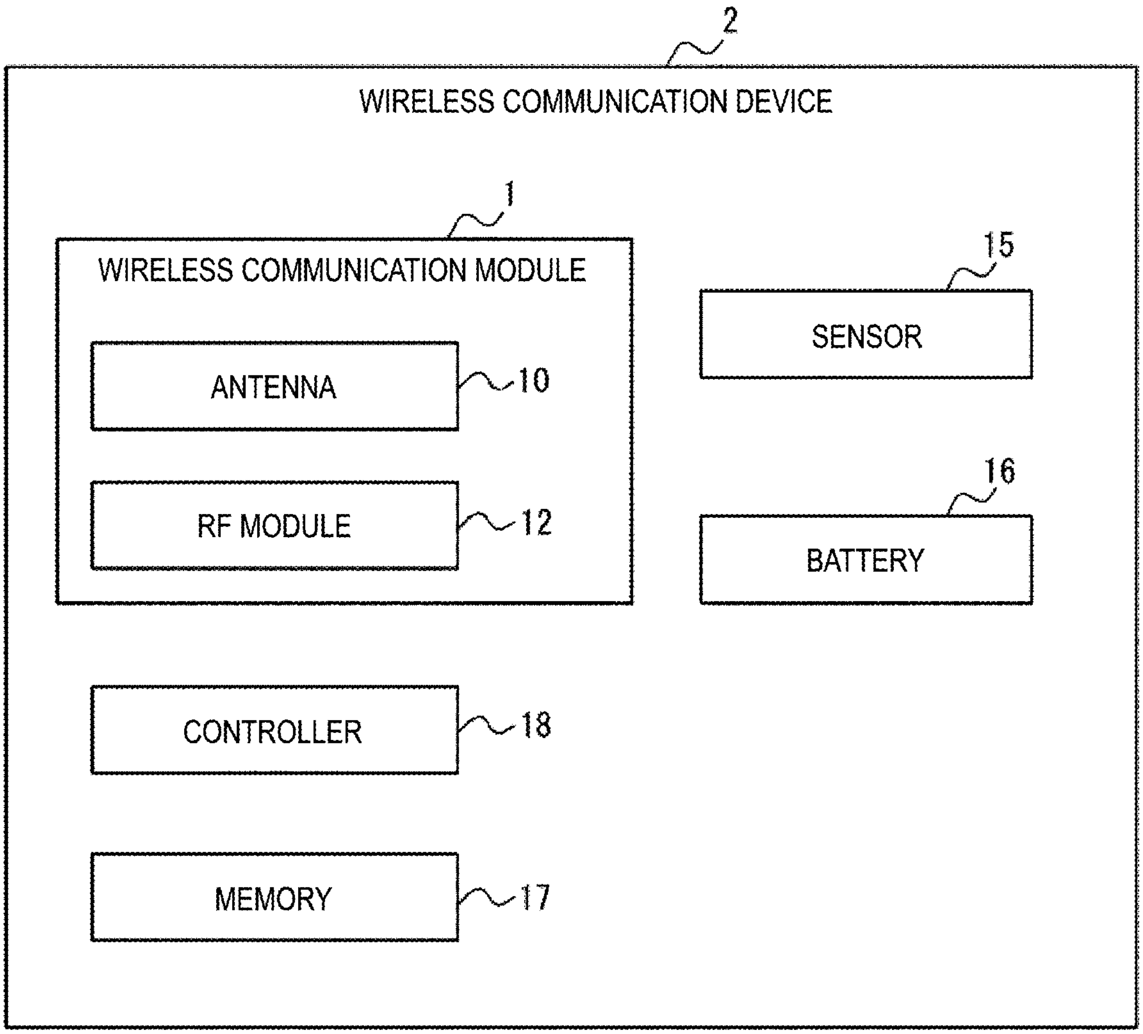
FIG. 37 is a block diagram of a wireless communication device according to an embodiment of the present disclosure.
Figure 38:
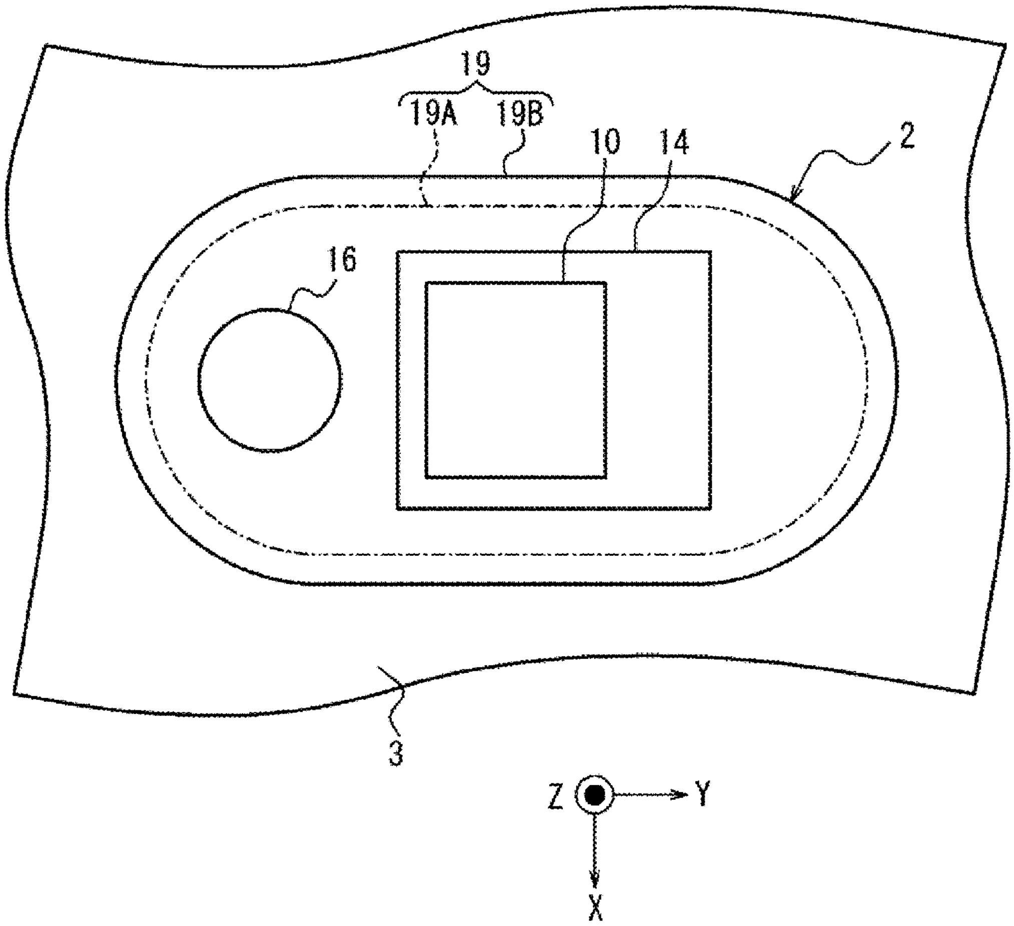
FIG. 38 is a plan view of the wireless communication device illustrated in FIG. 37.
Figure 39:
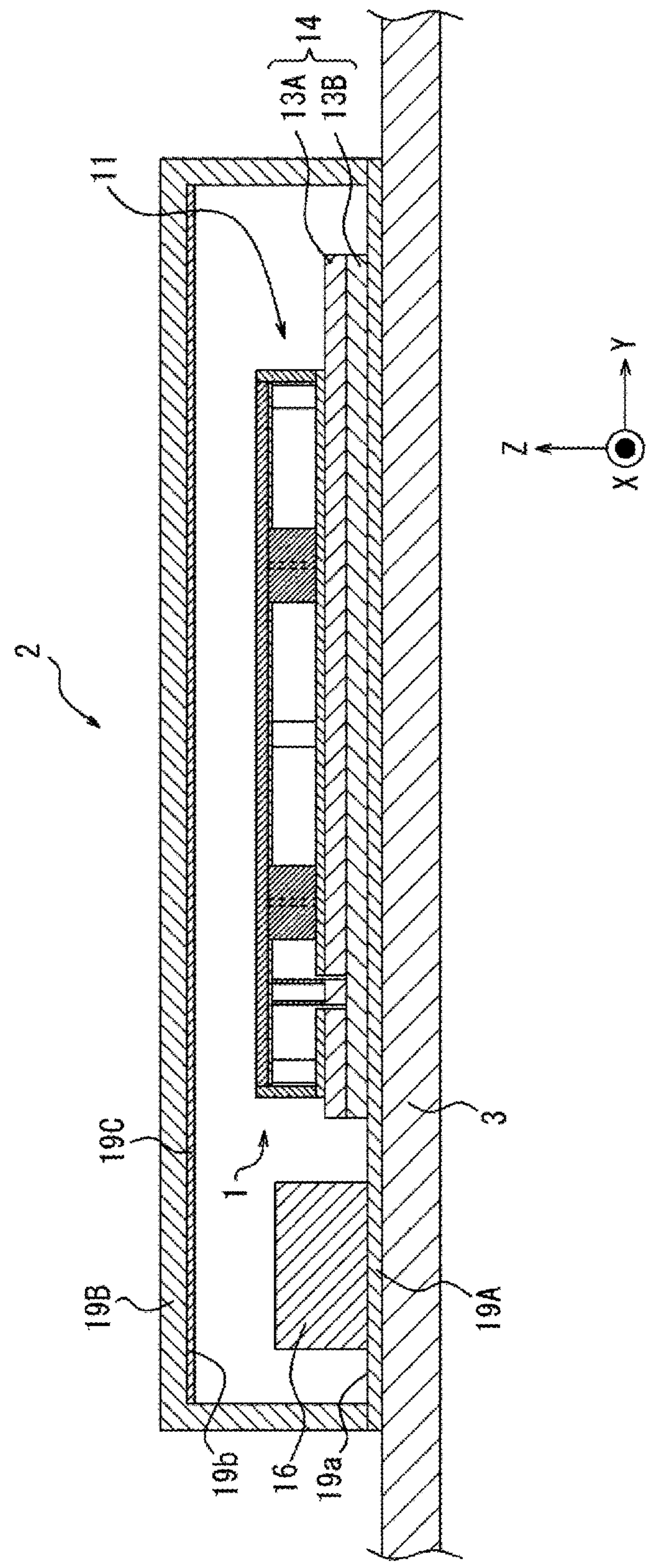
FIG. 39 is a cross-sectional view of the wireless communication device illustrated in FIG. 37.

FIG. 37 is a block diagram of a wireless communication device 2 according to an embodiment of the present disclosure. FIG. 38 is a plan view of the wireless communication device 2 illustrated in FIG. 37. FIG. 39 is a cross-sectional view of the wireless communication device 2 illustrated in FIG. 37.

As illustrated in FIG. 37, the wireless communication device 2 includes the wireless communication module 1, a sensor 15, a battery 16, a memory 17, and a controller 18. As illustrated in FIG. 38, the wireless communication device 2 may be located on a conductor member 3. The wireless communication device 2 may include a housing 19.

Examples of the sensor 15 may include a velocity sensor, a vibration sensor, an acceleration sensor, a gyroscopic sensor, a rotation angle sensor, an angular velocity sensor, a geomagnetic sensor, a magnet sensor, a temperature sensor, a humidity sensor, an air pressure sensor, an optical sensor, an illumination sensor, a UV sensor, a gas sensor, a gas concentration sensor, an atmosphere sensor, a level sensor, an odor sensor, a pressure sensor, a pneumatic sensor, a contact sensor, a wind sensor, an infrared sensor, a motion sensor, a displacement sensor, an image sensor, a weight sensor, a smoke sensor, a leakage sensor, a vital sensor, a battery level sensor, an ultrasound sensor, and a global positioning system (GPS) signal receiver.

The battery 16 supplies electrical power to the wireless communication module 1. The battery 16 may supply electrical power to at least one of the sensor 15, the memory 17, or the controller 18. The battery 16 may include at least one of a primary battery or a secondary battery. The negative pole of the battery 16 is electrically connected to the ground terminal of the circuit substrate 14 illustrated in FIG. 36. The negative pole of the battery 16 is electrically connected to the second conductor 50 of the antenna 10.

The memory 17 may include, for example, a semiconductor memory. The memory 17 may function as a work memory for the controller 18. The memory 17 may be included in the controller 18. The memory 17 stores programs describing contents of processing for implementing the functions of the wireless communication device 2, information used for processing in the wireless communication device 2, and the like.

The controller 18 may include, for example, a processor. The controller 18 may include one or more processors. The processor may include a general-purpose processor that reads a specific program in order to execute a specific function and a dedicated processor dedicated to a specific processing. The dedicated processor may include an application-specific IC. The application-specific IC is also referred to as an application specific integrated circuit (ASIC). The processors may include a programmable logic device. The programmable logic device is also called a programmable logic device (PLD). The PLD may include a field-programmable gate array (FPGA). The controller 18 may be either a system-on-a-chip (SoC) or a system in a package (SiP), in which one or a plurality of processors cooperate. The controller 18 may store, in the memory 17, various types of information, or programs and the like for causing the components of the wireless communication device 2 to operate.

The controller 18 generates a transmission signal to be transmitted from the wireless communication device 2. The controller 18 may obtain measurement data from, for example, the sensor 15. The controller 18 may generate a transmission signal in accordance with the measurement data. The controller 18 may transmit a baseband signal to the RF module 12 of the wireless communication module 1.

As illustrated in FIG. 38, the housing 19 protects other devices of the wireless communication device 2. The housing 19 may include a first housing 19A and a second housing 19B.

As illustrated in FIG. 39, the first housing 19A may extend on the XY plane. The first housing 19A supports other devices.

The first housing 19A may support the wireless communication device 2. The wireless communication device 2 is located on an upper surface 19*a* of the first housing 19A. The first housing 19A may support the battery 16. The battery 16 is located on the upper surface 19*a* of the first housing 19A. On an upper surface 19*a* of the first housing 19A, the wireless communication module 1 and the battery 16 may be arranged side by side along the X direction. The first connection conductor group 30 illustrated in FIG. 1 of the antenna 10 is located between the battery 16 and the first conductor 40 illustrated in FIG. 1 of the antenna 10. The battery 16 is located on a side facing the first connection conductor group 30 when viewed from the first conductor 40 illustrated in FIG. 1 of the antenna 10.

The second housing 19B may cover other devices. The second housing 19B includes a lower surface 19*b* located on the Z axis negative direction side of the antenna 10. The lower surface 19*b* extends along the XY plane. The lower surface 19*b* is not limited to a flat surface, and may include recesses and protrusions. The second housing 19B may include a conductor member 19C. The conductive member 19C may be located on the lower surface 19*b* of the second housing 19B. The conductor member 19C may be located in at least one of three places: inside of, on an outer side of, or on an inner side of the second housing 19B. The conductor member 19C may be located on an upper surface of the second housing 19B and a side surface thereof.

The conductor member 19C faces the antenna 10. The antenna 10 is coupled to the conductor member 19C and can radiate electromagnetic waves by using the conductor member 19C as a secondary radiator. The antenna 10 and the conductor member 19C facing each other may increase capacitive coupling between the antenna 10 and the conductor member 19C. The electrical current direction of the antenna 10 being along an extending direction of the conductor member 19C may increase electromagnetic coupling between the antenna 10 and the conductor member 19C. This coupling may function as mutual inductance.

The configurations according to the present disclosure are not limited only to the embodiments described above, and some variations or changes can be made. For example, the functions and the like included in each of the components and the like can be relocated, provided that logical inconsistencies are avoided, and a plurality of components or the like can be combined into one or divided.

The drawings for describing the configuration according to the present disclosure are schematic. The dimensional proportions and the like in the drawings do not necessarily coincide with the actual values.

In the present disclosure, the terms "first", "second", "third", and the like are each an example of an identifier for distinguishing a particular configuration. The configurations distinguished by the terms "first", "second", and the like in the present disclosure may change the numbers thereof with each other. For example, the identifiers "first" and "second" as in the first frequency band and the second frequency band are interchangeable. The identifiers are interchanged simultaneously. The configurations are distinguished even after the identifiers are interchanged. The identifiers may be deleted. Configurations with deleted identifiers are distinguished by reference sign. No interpretation on the order of the configurations, no grounds for the presence of an identifier of a lower value, and no grounds for the presence of an identifier of a higher value shall be given based solely on the description of identifiers in the present disclosure such as "first" and "second".

REFERENCE SIGNS LIST

1 Wireless communication module
2 Wireless communication device
3 Conductor member
10, 110, 210 Antenna
12 RF module
13A Ground conductor
13B Organic substrate
14 Circuit substrate
15 Sensor
16 Battery
17 Memory
18 Controller
19 Housing
19A First housing
19B Second housing
19C Conductor member
19*a* Upper surface
19*b* Lower surface
20 Base
21 Upper portion
22 Side wall portion
23 Pillar portion
30 First connection conductor group
31 First connection conductor
32 Second connection conductor group
33 Second connection conductor
34 Third connection conductor group
35 Third connection conductor
40, 140, 240 First conductor
41, 41-1, 41-2, 41-3, 141, 141-1, 141-2, 241, 241-1, 241-2, 241-3 Conductive element
42, 42-1, 42-2, 142, 142-1, 142-2, 144, 145, 145-1, 145-2, 242, 242-1, 242-2, 245-1, 245-2 Gap

43*a*, 43*b*, 43*c*, 43*d*, 43*e*, 43*f*, 143*c*, 143*d* Connecting portion
50 Second conductor
50A Opening portion
51, 51-1, 51-2 Fourth conductor
60 Feed line
C1, C2, C3, C4 Capacitative element

The invention claimed is:

1. An antenna, comprising:
- a first connection conductor group comprising a plurality of first connection conductors aligned in a first direction;
- a second connection conductor group comprising a plurality of second connection conductors aligned in the first direction and aligning with the first connection conductor group in a second direction intersecting the first direction;
- a third connection conductor group comprising a plurality of third connection conductors aligned in the first direction and aligning with the first connection conductor group and the second connection conductor group in the second direction;
- a first conductor configured to capacitively connect the first connection conductor group and the second connection conductor group and to capacitively connect the second connection conductor group and the third connection conductor group;
- a second conductor configured to be electrically connected to the first connection conductor group, the second connection conductor group, and the third connection conductor group; and
- a feed line configured to be electromagnetically connected to the first conductor, wherein
- the first conductor includes a first conductive element, a second conductive element, and a third conductive element, and
- the first connection conductor group, the second connection conductor group, and the third connection conductor group are respectively connected to the first conductive element, the second conductive element, and the third conductive element.

2. The antenna according to claim 1, wherein the plurality of first connection conductors, the plurality of second connection conductors, and the plurality of third connection conductors are each along a third direction intersecting a first plane comprising the first direction and the second direction.

3. The antenna according to claim 1, wherein the antenna is configured to emit electromagnetic waves in a first frequency band by a loop electrical current flowing along:
- a first loop comprising the first connection conductor group, the second connection conductor group, the first conductor, and the second conductor; and
- a second loop comprising the second connection conductor group, the third connection conductor group, the first conductor, and the second conductor.

4. The antenna according to claim 3, wherein
- the plurality of first connection conductors, the plurality of second connection conductors, and the plurality of third connection conductors are each along a third direction intersecting a first plane comprising the first direction and the second direction, and
- the antenna is configured to emit electromagnetic waves in a second frequency band higher than the first frequency band, with an orientation of an electrical current flowing along the third direction through the first connection conductor group, an orientation of an electrical current flowing along the third direction through the second connection conductor group, and an orientation of an electrical current flowing along the third direction through the third connection conductor group being identical.

5. The antenna according to claim 4, wherein the antenna is configured to serve as a dielectric resonator antenna in the second frequency band.

6. The antenna according to claim 3, wherein the antenna is configured to emit electromagnetic waves in a further frequency band higher than the first frequency band, with an orientation of the electrical current flowing through the first connection conductor group and an orientation of the electrical current flowing through the third connection conductor group being opposite each other.

7. The antenna according to claim 6, wherein the antenna is configured to emit electromagnetic waves in the further frequency band, with an orientation of an electrical current flowing toward and through the plurality of second connection conductors and the plurality of first connection conductors, and an orientation of an electrical current flowing through and away from the plurality of second connection conductors and the plurality of third connection conductors being opposite each other.

8. The antenna according to claim 6, wherein the antenna is configured to serve as a dielectric resonator antenna in the further frequency band.

9. A wireless communication module, comprising:
- the antenna according to claim 1; and
- an RF module configured to be electrically connected to the feed line.

10. A wireless communication device, comprising:
- the wireless communication module according to claim 9; and
- a battery configured to supply electrical power to the wireless communication module.

11. An antenna, comprising:
- a first connection conductor group comprising a plurality of first connection conductors aligned in a first direction;
- a second connection conductor group comprising a plurality of second connection conductors aligned in the first direction and aligning with the first connection conductor group in a second direction intersecting the first direction;
- a third connection conductor group comprising a plurality of third connection conductors aligned in the first direction and aligning with the first connection conductor group and the second connection conductor group in the second direction;
- a first conductor configured to capacitively connect the first connection conductor group and the second connection conductor group and to capacitively connect the second connection conductor group and the third connection conductor group;
- a second conductor configured to be electrically connected to the first connection conductor group, the second connection conductor group, and the third connection conductor group; and
- a feed line configured to be electromagnetically connected to the first conductor, wherein
- the antenna is configured to emit electromagnetic waves in a first frequency band by a loop electrical current flowing along:

a first loop comprising the first connection conductor group, the second connection conductor group, the first conductor, and the second conductor; and a second loop comprising the second connection conductor group, the third connection conductor group, the first conductor, and the second conductor, the plurality of first connection conductors, the plurality of second connection conductors, and the plurality of third connection conductors are each along a third direction intersecting a first plane comprising the first direction and the second direction, the antenna is configured to emit electromagnetic waves in a second frequency band higher than the first frequency band, with an orientation of an electrical current flowing along the third direction through the first connection conductor group, an orientation of an electrical current flowing along the third direction through the second connection conductor group, and an orientation of an electrical current flowing along the third direction through the third connection conductor group being identical, and the antenna is configured to serve as a dielectric resonator antenna in the second frequency band.

12. An antenna, comprising:

a first connection conductor group comprising a plurality of first connection conductors aligned in a first direction;

a second connection conductor group comprising a plurality of second connection conductors aligned in the first direction and aligning with the first connection conductor group in a second direction intersecting the first direction;

a third connection conductor group comprising a plurality of third connection conductors aligned in the first direction and aligning with the first connection conductor group and the second connection conductor group in the second direction;

a first conductor configured to capacitively connect the first connection conductor group and the second connection conductor group and to capacitively connect the second connection conductor group and the third connection conductor group;

a second conductor configured to be electrically connected to the first connection conductor group, the second connection conductor group, and the third connection conductor group; and a feed line configured to be electromagnetically connected to the first conductor, wherein the antenna is configured to emit electromagnetic waves in a first frequency band by a loop electrical current flowing along:

a first loop comprising the first connection conductor group, the second connection conductor group, the first conductor, and the second conductor; and a second loop comprising the second connection conductor group, the third connection conductor group, the first conductor, and the second conductor, and the antenna is configured to emit electromagnetic waves in a further frequency band higher than the first frequency band, with an orientation of the electrical current flowing through the first connection conductor group and an orientation of the electrical current flowing through the third connection conductor group being opposite each other.

* * * * *